J. GRAVES.
BATTERY CORE MAKING MACHINE.
APPLICATION FILED JULY 5, 1918.
1,382,639.
Patented June 28, 1921.
12 SHEETS—SHEET 9.
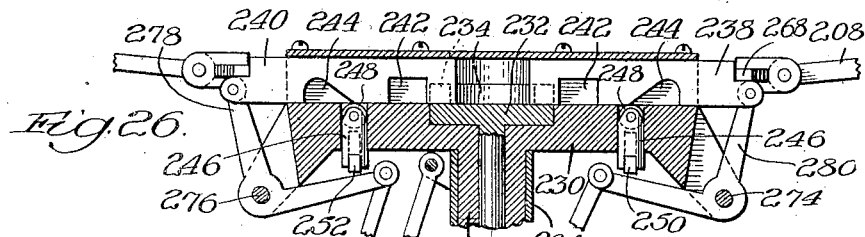
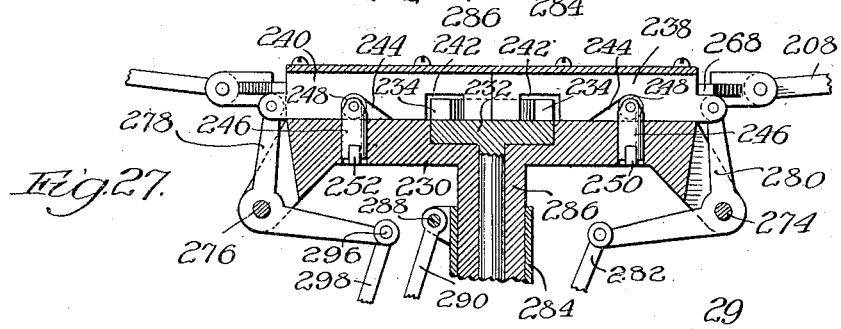
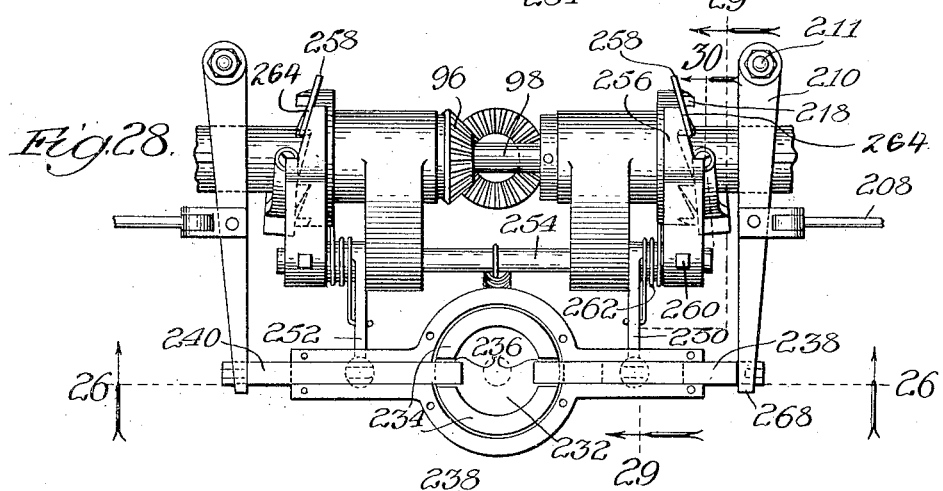
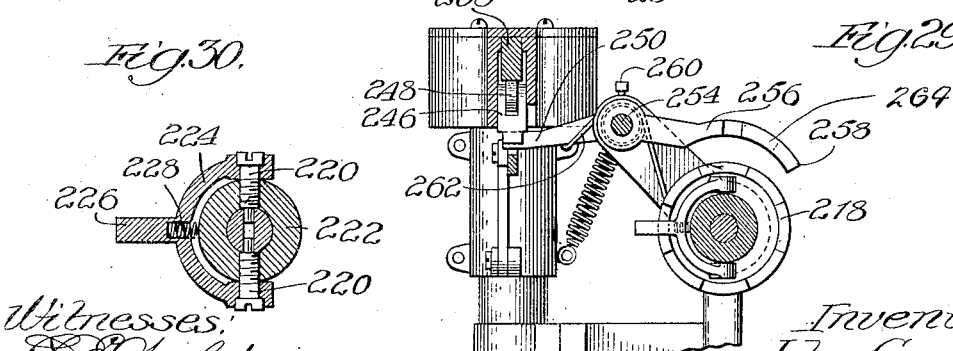
Witnesses:
Inventor:
John Graves,
By Cheever & Cox
Attys.

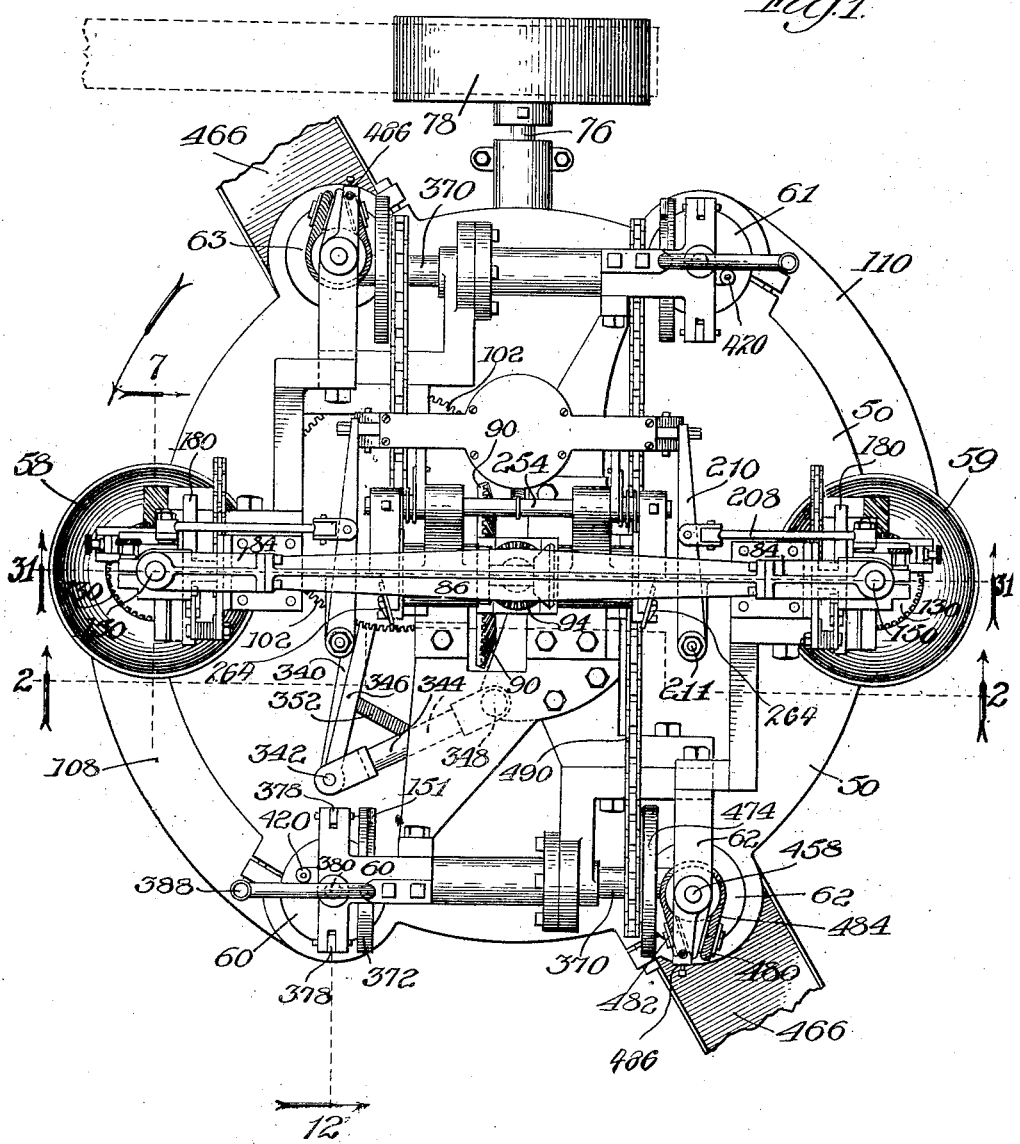

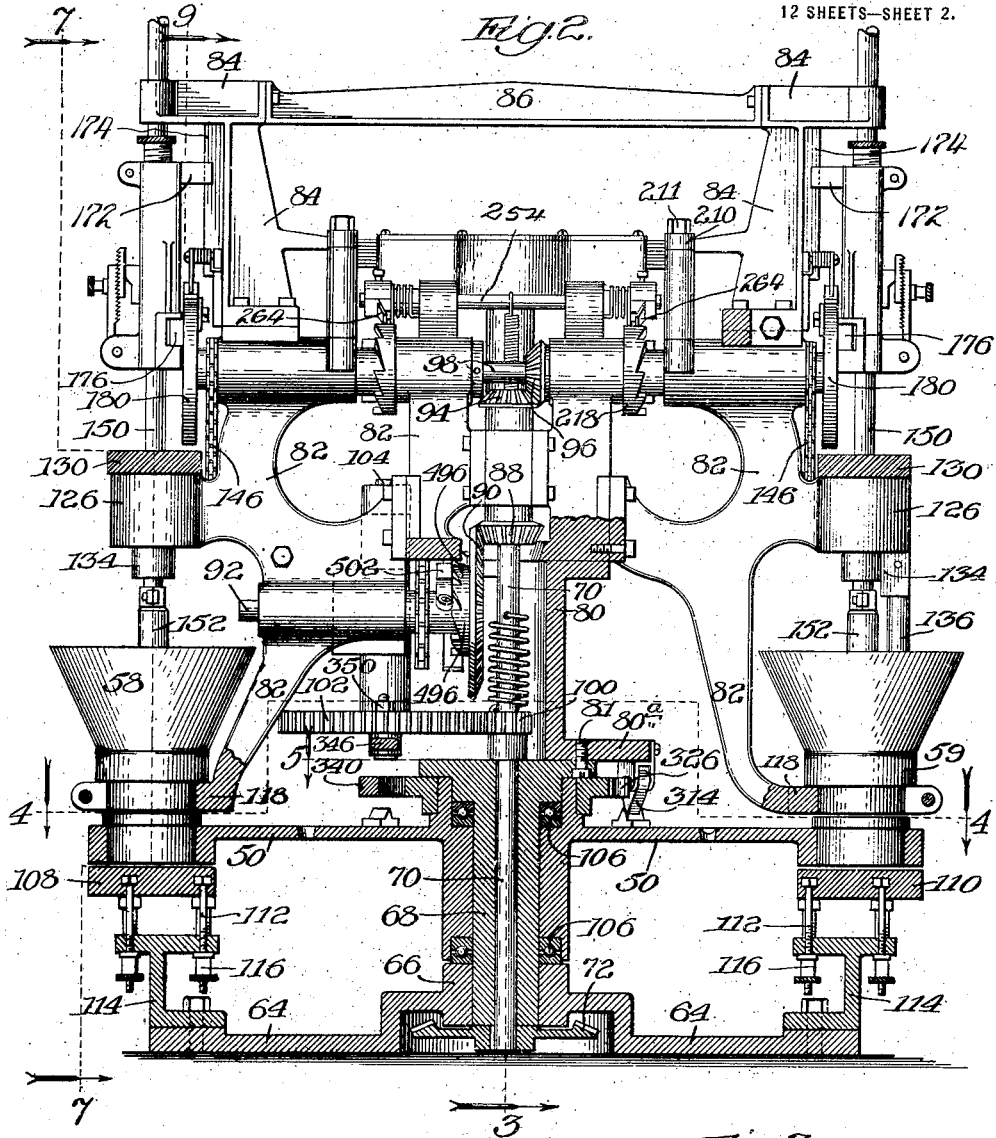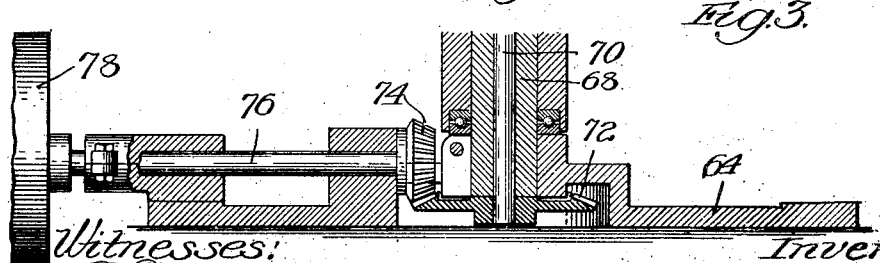

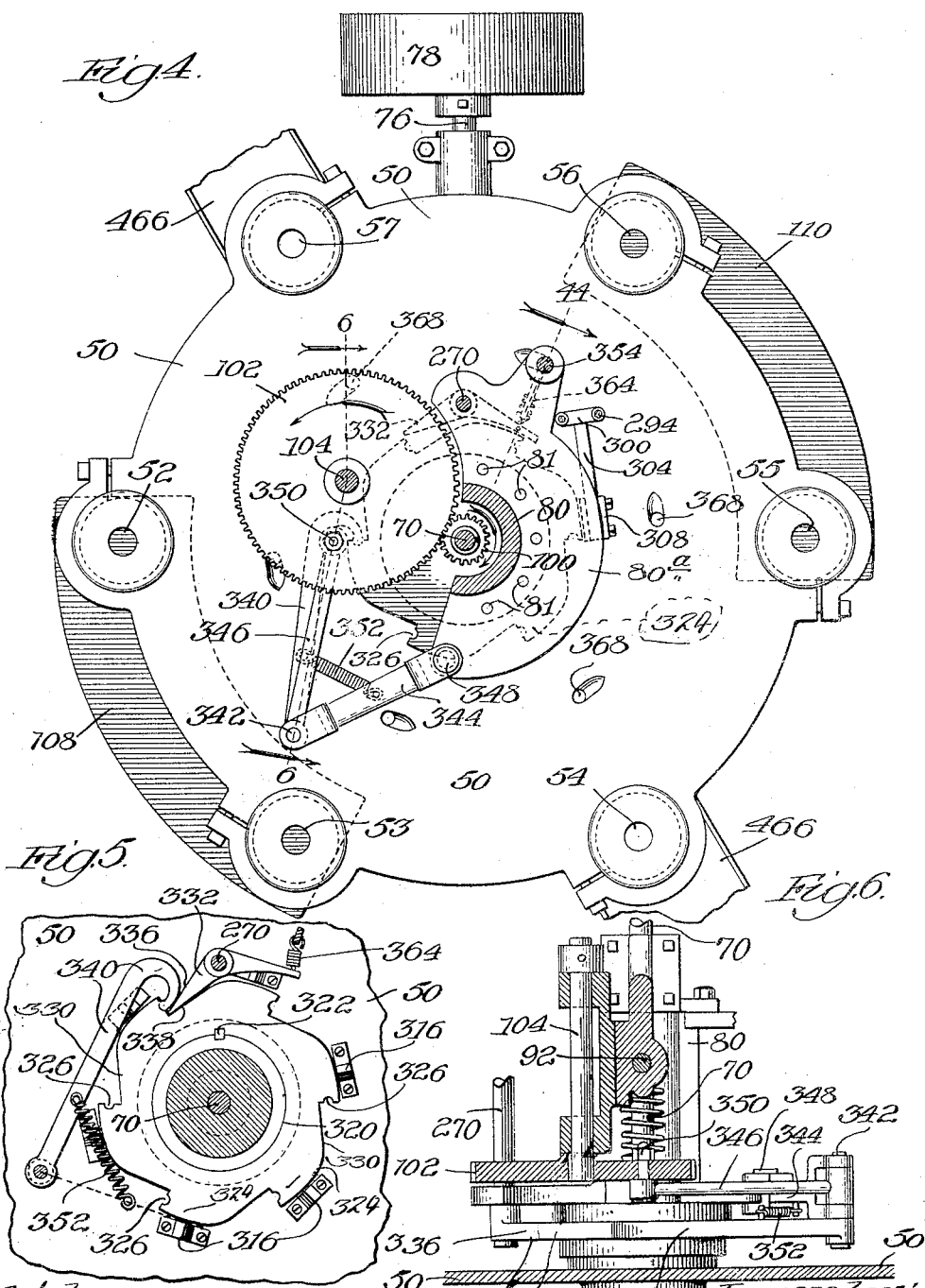

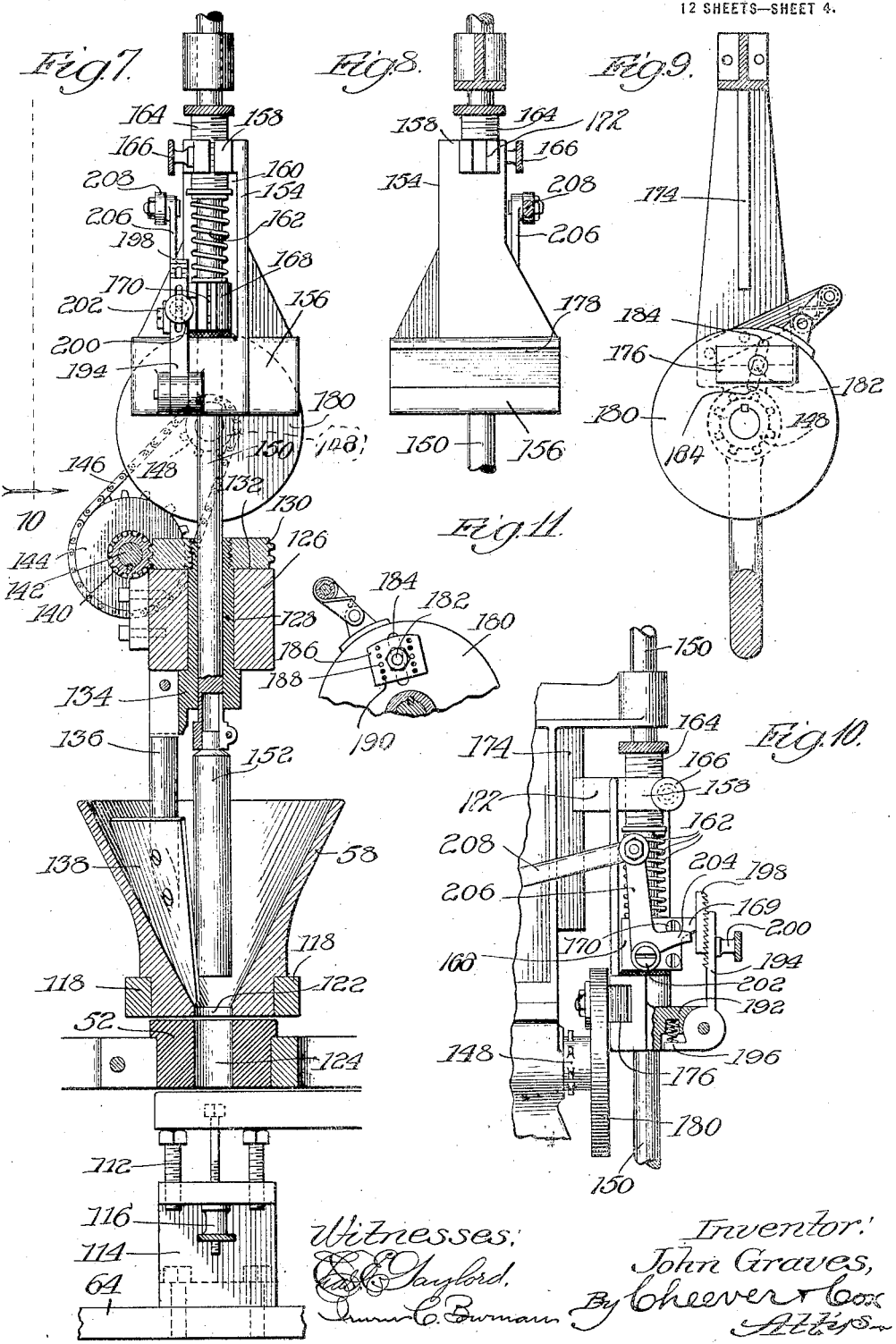

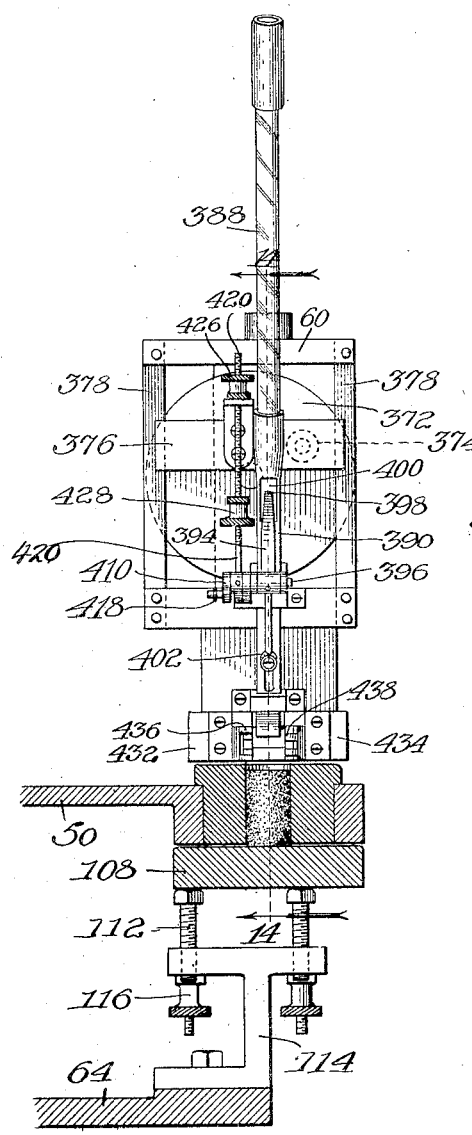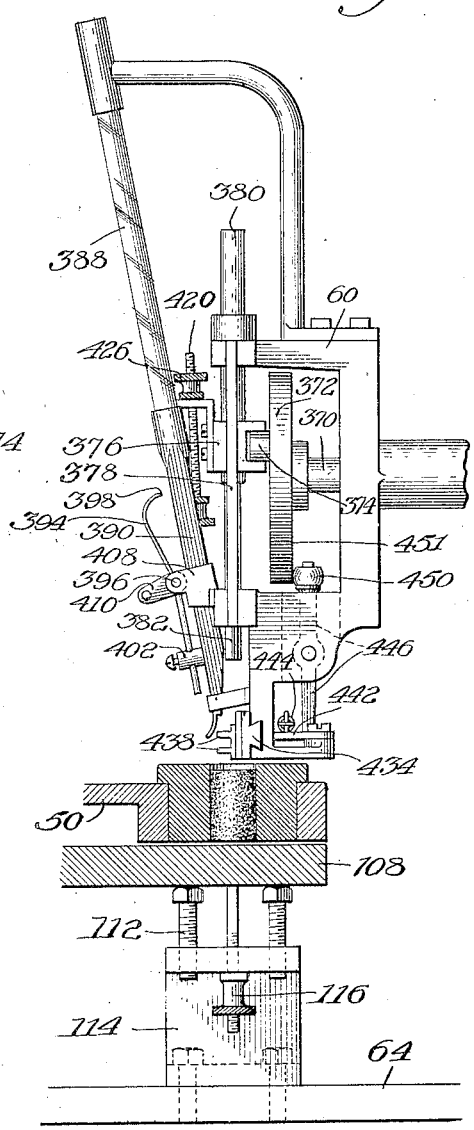

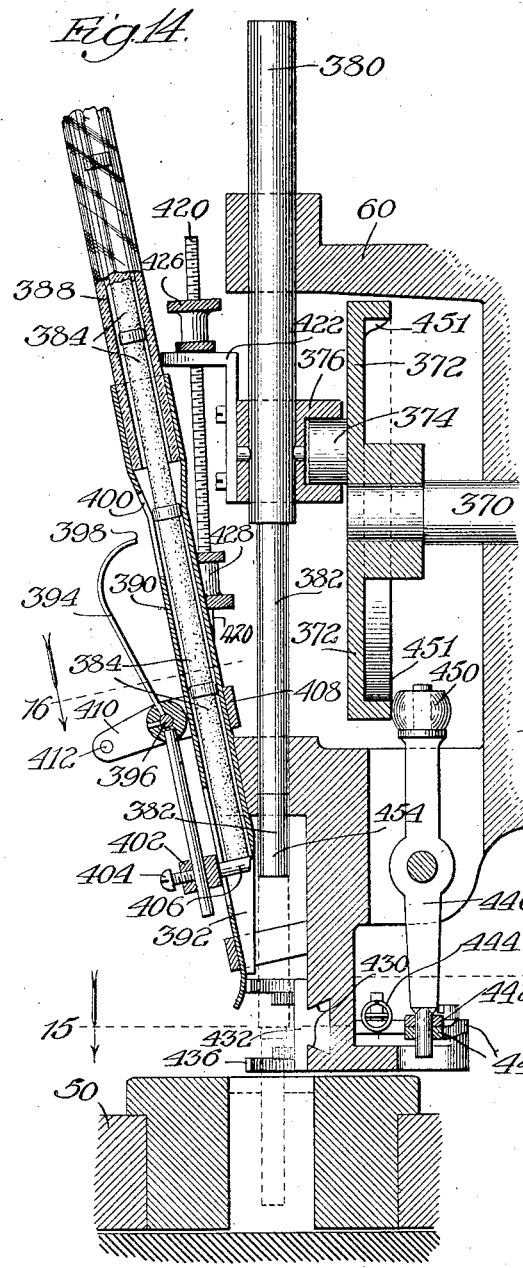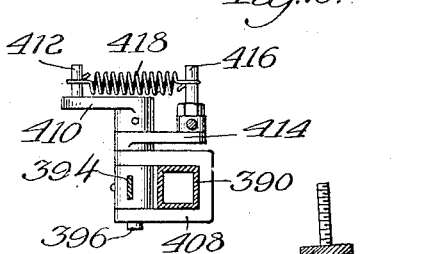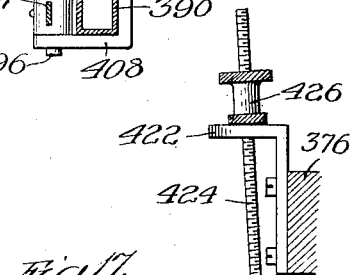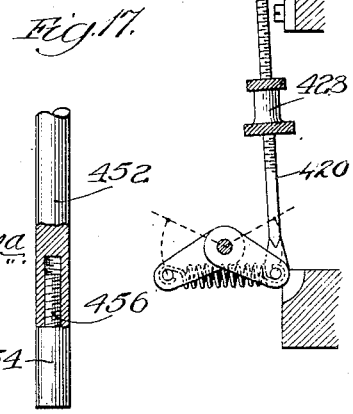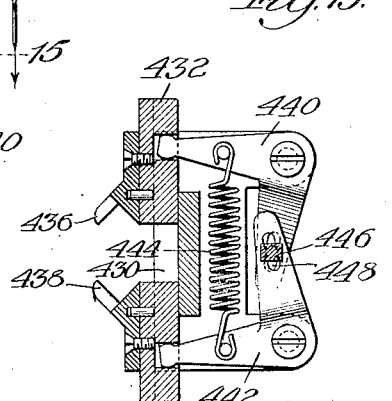

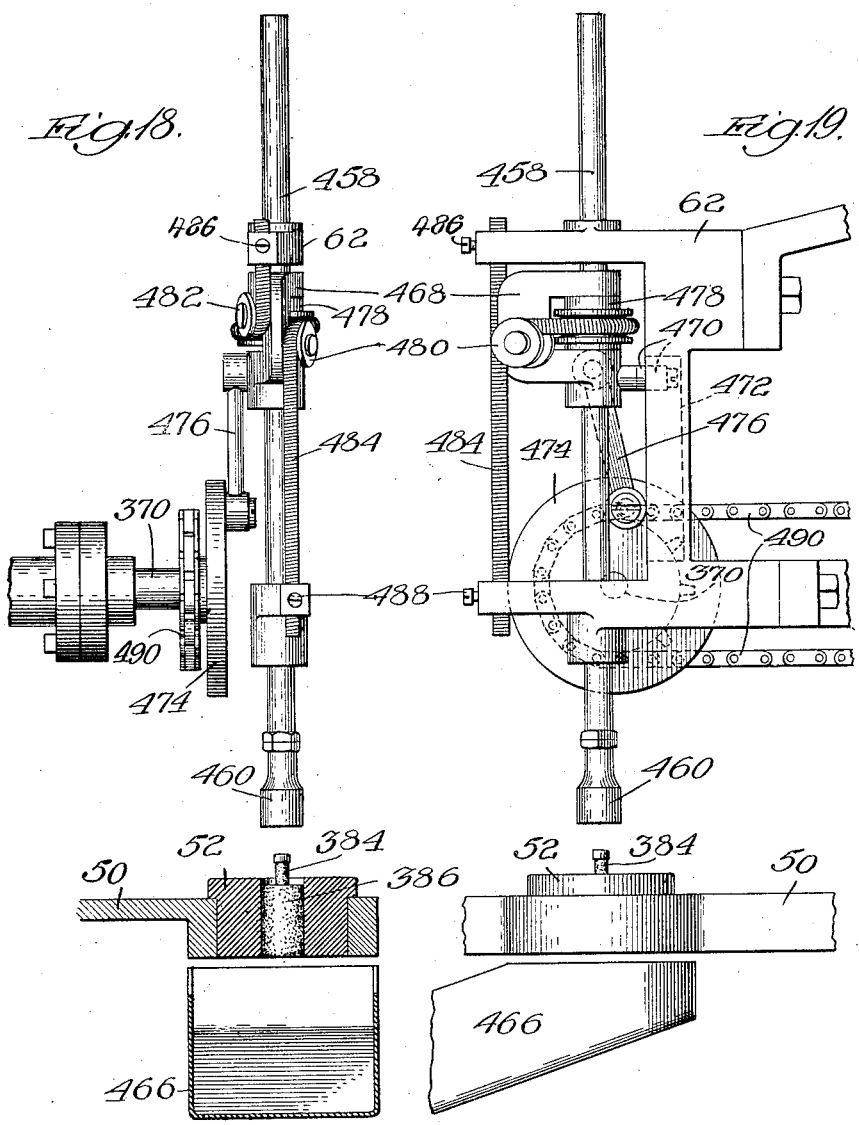

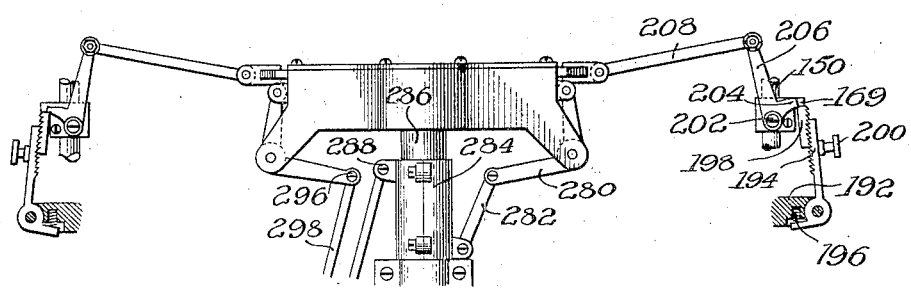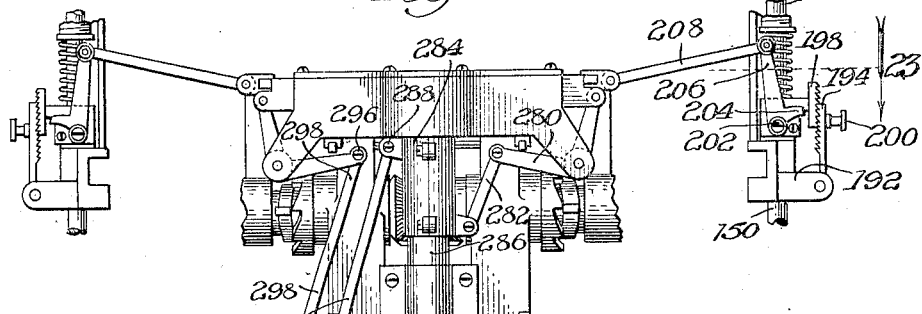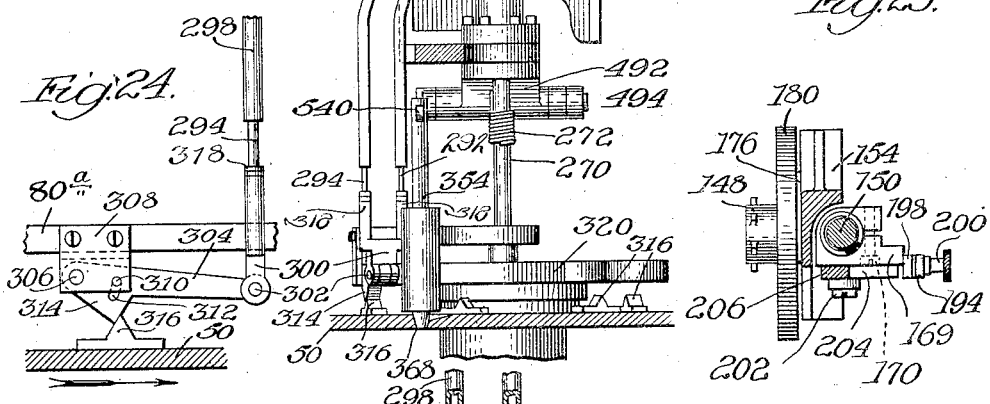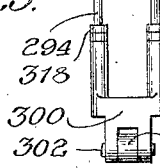

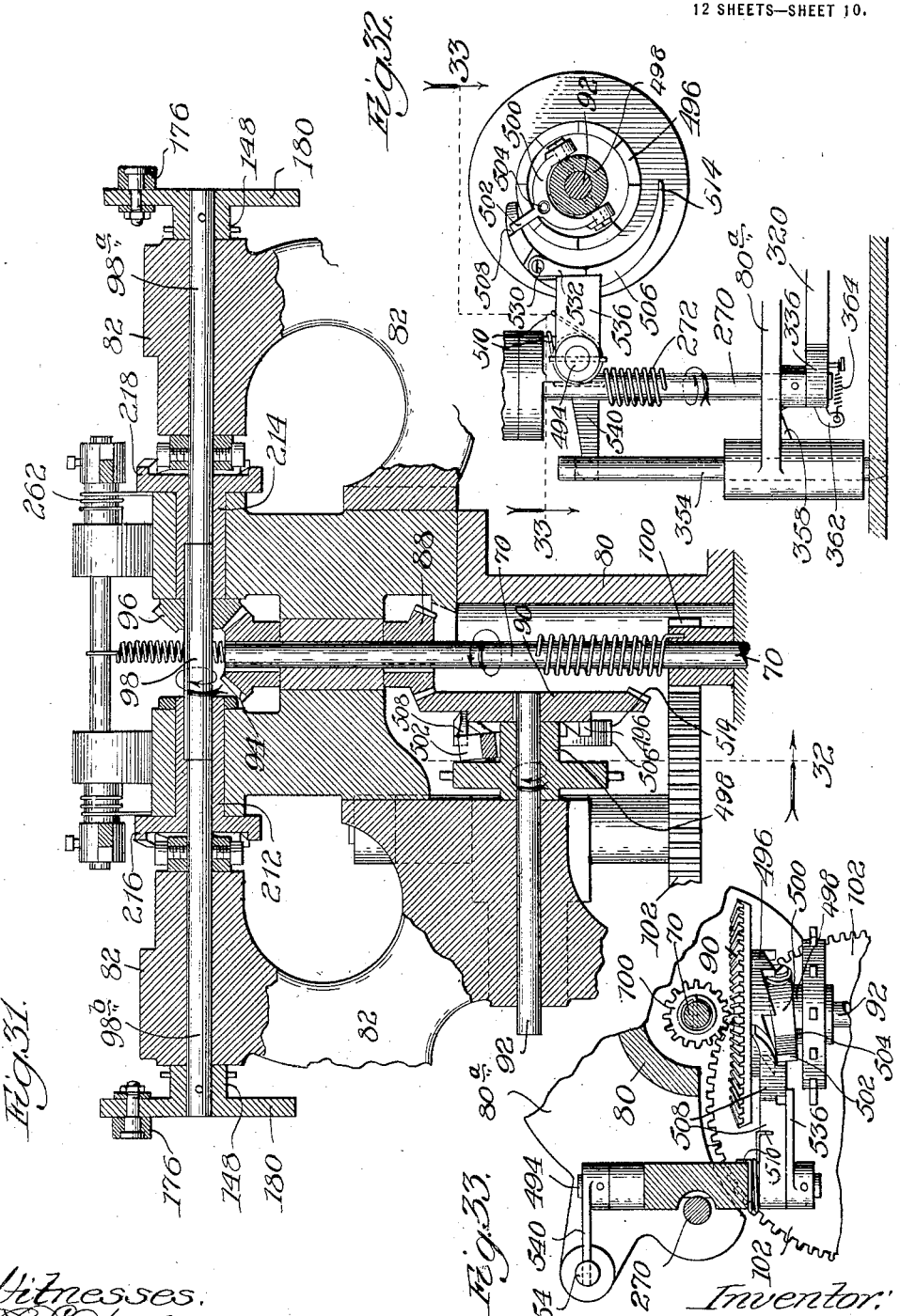

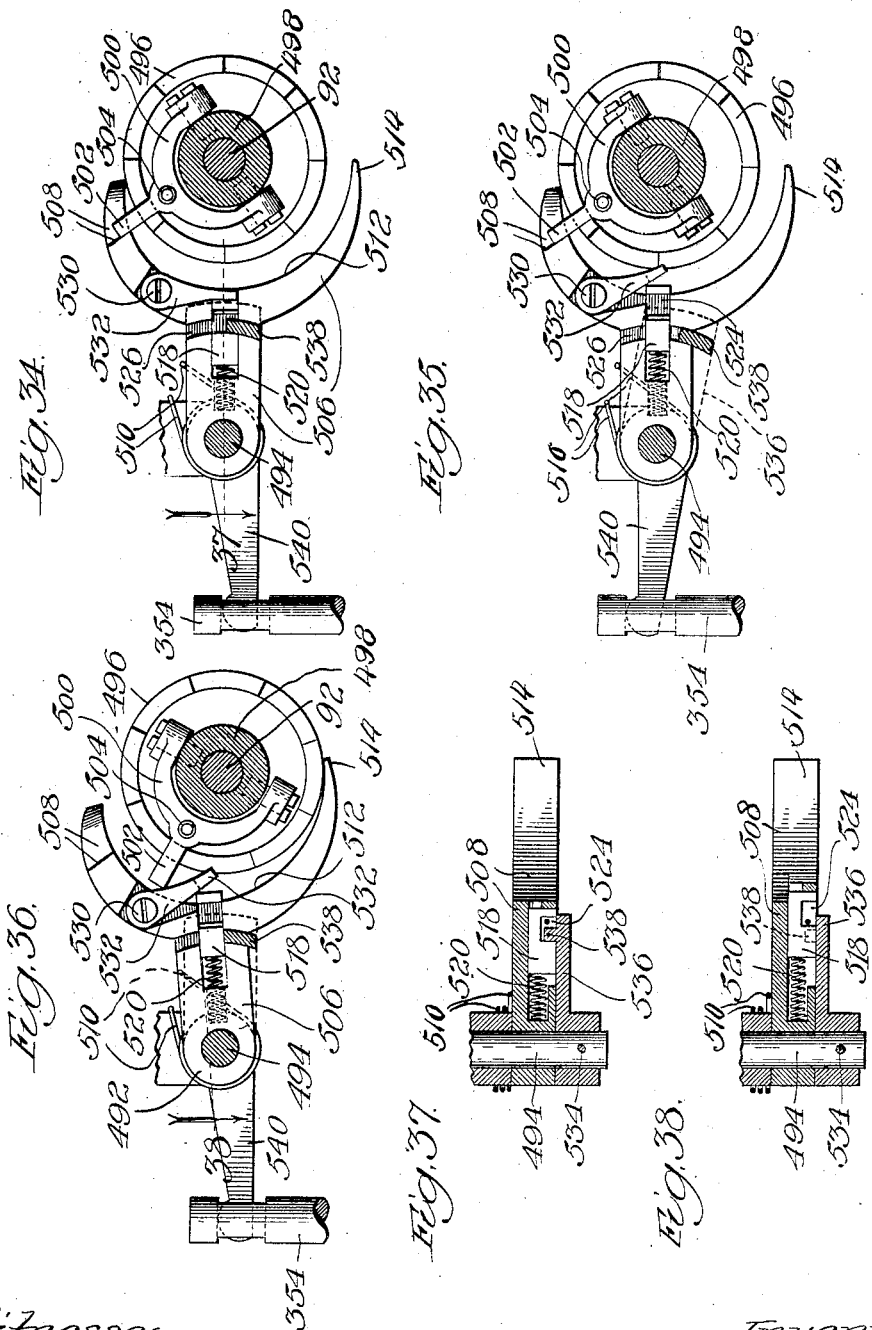

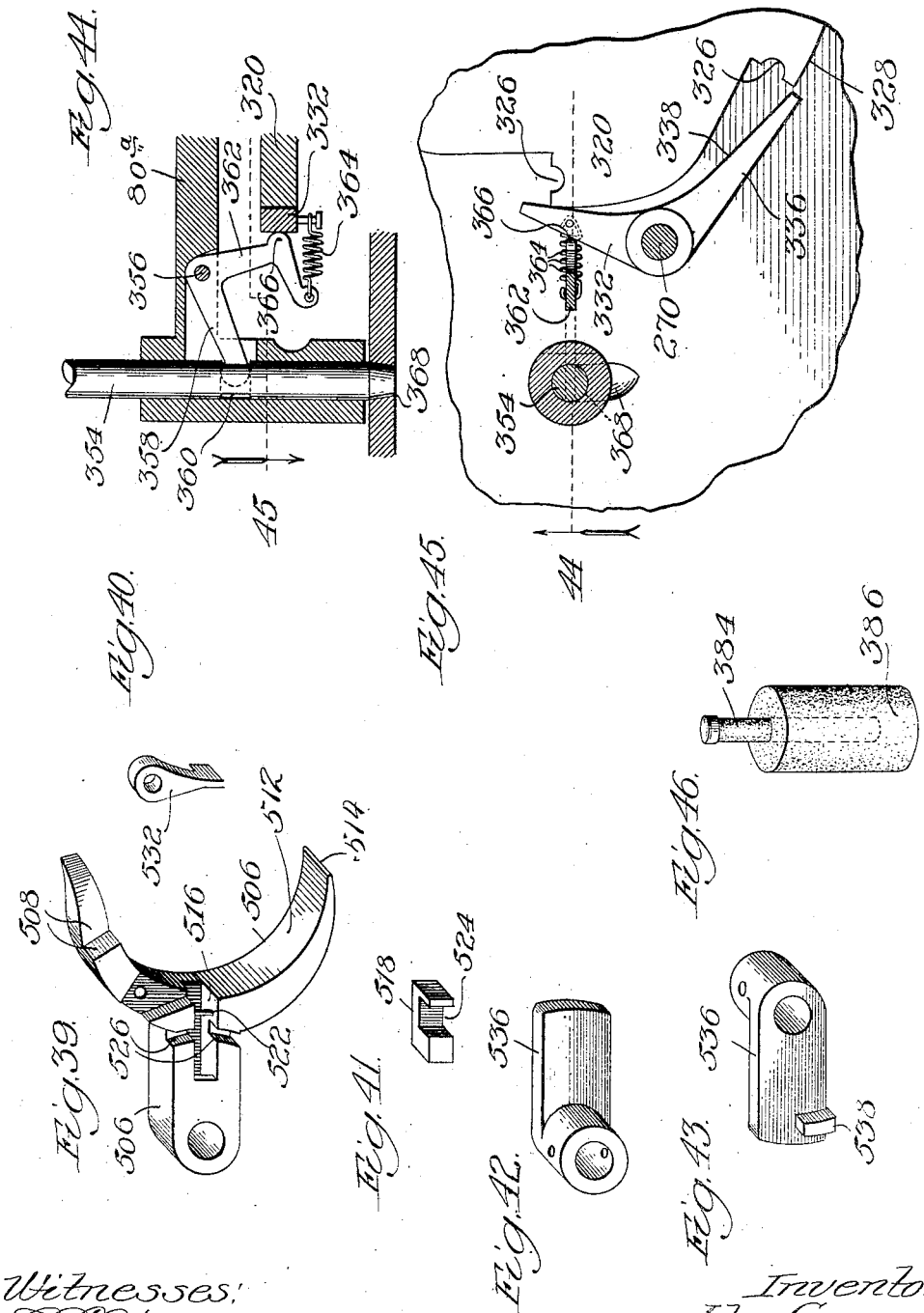

UNITED STATES PATENT OFFICE.

JOHN GRAVES, OF MADISON, WISCONSIN, ASSIGNOR TO FRENCH BATTERY & CARBON CO., OF MADISON, WISCONSIN, A CORPORATION OF WISCONSIN.

BATTERY-CORE-MAKING MACHINE.

1,382,639.              Specification of Letters Patent.     Patented June 28, 1921.

Application filed July 5, 1918. Serial No. 243,503.

*To all whom it may concern:*

Be it known that I, JOHN GRAVES, a citizen of the United States, residing at Madison, in the county of Dane and State of Wisconsin, have invented a certain new and useful Improvement in Battery-Core-Making Machines, of which the following is a specification.

In the manufacture of what are commonly known in the trade as dry batteries, for use in hand flash lamps and the like, it is common to surround a fixed carbon pencil with a more or less tightly pressed cylinder of depolarizing chemicals, commonly called mix, the same in some kinds of batteries taking the particular form shown in Figure 46 of the drawings, comprising the cylinder of depolarizing material 386 and the carbon pencil 384. In practice heretofore it has frequently been common to insert the carbon pencil in the mold and then tamp the depolarizing material or mix about it. I have found that more satisfactory results are obtained both in operative manipulations of manufacture and in actual use in a battery, if the cylinder of depolarizing material is first formed in a mold and then the carbon pencil is pressed into it.

The object of this invention is to provide an automatic machine in which not only one but a plurality of such cylindrical bobbins or cores of depolarizing material or mix may be manufactured and carbon pencils inserted therein, in position ready for use. The problem of so manufacturing a plurality of such products presents material difficulties in that the cylinders or bobbins of depolarizing material have to be, for practical use in the battery, of certain predetermined dimensions and the material has to be tamped to a certain predetermined density, and it is practically impossible to tamp two such cylinders side by side to exactly the same dimensions and density in a given unit of time. The object of this invention is, therefore, to provide a machine which will first tamp a plurality of such cylinders of depolarizing material, automatically giving to each the attention it requires, in order to establish in it the proper size and density, and then when such a plurality of cores have been completed, have the machine automatically go on inserting carbon pencils in such cylinders previously formed, do this complete before other cylinders being formed are completed, and finally to eject the finished product from the machine in proper condition for use.

The invention consists in a machine capable of carrying out the foregoing objects which can be easily and comparatively cheaply made, which is both automatic and efficient in operating, and which is not readily liable to get out of order. It consists more particularly in many special features and details of construction, which will be hereafter more fully set forth in the specification and claims.

Referring to the drawings, in which similar numerals indicate to the same parts throughout the several views.

Fig. 1 is a plan view of a machine illustrating this invention in its preferred form, designed and heretofore built and used to simultaneously make two of the cores or bobbins in question.

Fig. 2 is a front view showing certain parts in section taken on the irregular line 2—2 Fig. 1.

Fig. 3 is a detailed sectional view on line 3 of Fig. 2, showing the method of applying power to the machine.

Fig. 4 is a plan view taken on the irregular line 4—4 of Fig. 2, illustrating the main revolving table in which the molds for forming the bobbins are placed and showing somewhat in detail the mechanism for revolving the table.

Fig. 5 is a detailed plan view taken on the line 5 of Fig. 2.

Fig. 6 is a side detail view taken on the line 6—6 of Fig. 4, showing the table actuating means.

Fig. 7 is a side detail view, partially in section, on the line 7—7 of Fig. 2, showing the core tamping mechanism and attached parts.

Fig. 8 is a rear view of the upper portion of the parts shown in Fig. 7.

Fig. 9 is a detail view of the crank wheel and sliding block used as hereafter described in vertically reciprocating the tamping head.

Fig. 10 is a side view of the mechanism illustrated at the upper portion of Fig. 7, taken in the direction of arrow 10.

Fig. 11 is a detail plan view of means for adjusting the length of stroke of the tamping head.

Fig. 12 is a side view of the carbon inserting mechanism taken on the line 12 of Fig. 1.

Fig. 13 is a front view of the same mechanism taken at right angles to the position of Fig. 12.

Fig. 14 is an enlargement of Fig. 13, taken in section, at approximately the center so as to show details.

Fig. 15 is a detail plan view on the irregular line 15—15 of Fig. 14.

Fig. 14A is a sectional detail view of the carbon inserting plunger, showing a method by which a different tool can be substituted.

Fig. 16 is a detail plan view on line 16 of Fig. 14.

Fig. 17 is a detail view of certain parts of the carbon releasing or feeding mechanism.

Fig. 18 is a front view, and

Fig. 19 is a side view of the ejector mechanism.

Fig. 20 is a detail view of the ejector plunger, showing means for adjusting it, or substituting a new tool thereon.

Fig. 21 is a front view of the synchronizing mechanism for insuring the completion of each core before rotation of the table to the next operative position.

Fig. 22 is a changed position view of the mechanism at the upper portion of Fig. 21.

Fig. 23 is a detail plan view on the line 23 of Fig. 21.

Fig. 24 is a detail view of the cam mechanism for restoring the synchronizing mechanism to normal position after one set of cores has been tamped and removed from the tamping mechanism.

Fig. 25 is a side view of the connecting rods in relationship to the restoring mechanism taken at the right hand side of Fig. 24.

Fig. 26 is a central sectional view on the line 26—26 of Fig. 28, showing details of the mechanism at the central top portion of Fig. 21.

Fig. 27 is a changed position view of parts of Fig. 26.

Fig. 28 is a plan view of the central top portion of the mechanism illustrated in Fig. 21.

Fig. 29 is a side detail view on the line 29—29 of Fig. 28.

Fig. 30 is a sectional view of a ratchet dog taken on the line 30, Fig. 28.

Fig. 31 is a front sectional view taken on the line 31—31 of Fig. 1, showing details of the driving mechanism.

Fig. 32 is a side detail view of the clutch mechanism taken on the line 32 of Fig. 31.

Fig. 33 is a detail view of the clutch mechanism taken on the irregular line 33—33 of Fig. 32.

Fig. 34 is an enlarged detail view of that portion of the clutch mechanism shown in the upper right hand portion of Fig. 32.

Figs. 35 and 36 are changed position views of the mechanism of Fig. 34.

Fig. 37 is a sectional detail view on line 37, Fig. 34.

Fig. 38 is a corresponding view on line 38, Fig. 36.

Fig. 39 is a perspective view of the clutch release yoke removed from the associated parts of Figs. 32–35.

Figs. 40, 41, 42 and 43 are perspective views of parts of the clutch mechanism of Figs. 32 to 36.

Fig. 44 is a detail view of the table locking mechanism, taken on line 44, Fig. 45.

Fig. 45 is a plan view on the line 45 of Fig. 44.

Fig. 46 is a perspective view of a particular form of core which sometimes has to be made and has, for convenience, been used as illustrating one form of device which a machine of this invention is capable of producing.

In order to facilitate ready comprehension of the specifications on first reading, it may be stated that, broadly speaking, the machine comprises a mold carrying table 50, provided around its circumference with a plurality of molds 52, 53, 54, 55, 56, and 57. This table with these molds is adapted for intermittent rotation under a pair of oppositely disposed hoppers 58 and 59, located on opposite sides of the center of the table; under a correspondingly oppositely disposed pair of carbon inserting mechanisms 60 and 61, and under a correspondingly arranged pair of finished work ejecting mechanisms 62 and 63. One complete core or bobbin is formed by the mechanism connected with parts 58, 60 and 62 and a duplicate core or bobbin is formed by the mechanism 59, 61 and 63. The reader may, therefore, in considering the machine, at first entirely disregard one set of these mechanisms. Considering the first set of mechanisms: Assume that a given mold 52 is under the hopper 58. The mechanism above this hopper tamps depolarizing material previously placed and continuously supplied to the hopper into mold 52 until that mold is not only full, but contains material of a given volume and density which has previously been determined as required for the particular product which the machine is to manufacture at this particular time. When the core or bobbin has thus been formed in mold 52 automatic mechanism rotates the table 50 in a counter-clockwise direction until mold 52 is under carbon inserting mechanism 60, in the particular case here illustrated, one sixth of a revolution. This one-sixth rotation of table 50 has brought mold 52 under carbon inserting mechanism 60 and has brought a new mold 57 under hopper 58. The machine now reoperates, filling a new core in mold 57, and inserting the carbon pencil in mold 52, which is now under carbon inserting mechanism 60. When the new core has been formed in mold 57, the machine again intermittently operates one-sixth of a revolution of the table 50, moving mold 56 under hopper 58, moving mold 57 under carbon inserting mechanism 60, and moving mold 52 with its originally packed core and the carbon just inserted in it under ejecting mechanism 62. The machine now operates and simultaneously fills mold 56 with depolarizing material, inserts a new carbon pencil in the depolarizing material within mold 57, and ejects the finished core or bobbin from mold 52. This operation goes on continuously just as long as the machine is run and the hoppers are provided with depolarizing material, and the carbon inserting mechanism is provided with carbon pencils.

*General frame central power system.*

The machine is, of course, supported on some sort of frame. In the particular case here illustrated, this takes the form of a flat cast base plate 64, having in its center a hollow box like member 66, within which is rigidly secured by any suitable means a column 68, within which a vertical shaft 70 is journaled. On the lower end of shaft 70 is a gear wheel 72, to which power is supplied from any suitable source through gear 74, shaft 76, and pulley 78 in the obvious manner. In the particular case shown above, the main frame is continued upward through a separate casting 80, secured to column 68 by any suitable means as, for instance, screws 81. Suitably mounted on the upper end of casting 80 and secured thereto by any suitable means not shown in detail is main frame casting 82; which is continued upward by brackets 84, suitably secured by any suitable means, and in the particular case here illustrated connected together by a brace rod 86. On the main vertical shaft 70 heretofore described, is a pinion 88, meshing with a gear wheel 90 on shaft 92, journaled horizontally in the lower portion of main frame 82. This shaft 92 carries mechanism hereafter described which operates the carbon inserting and the ejecting mechanism heretofore referred to in general terms.

Also mounted on vertical shaft 70 is a pinion 94, meshing with a pinion 96 on horizontal shaft 98, journaled in the upper portion of frame 82, which shaft in the manner hereafter described, operates at its opposite ends, the core tamping, packing or forming mechanism.

The main shaft 70 also carries another pinion 100, meshing with a gear 102, located on the lower end of a vertical shaft 104, this gear 102 operating the mechanism shown in detail in Figs. 4 and 5 to intermittently rotate table 50 in the manner heretofore described in general terms. This table 50 is journaled about the column 68, heretofore described, on suitable ball bearing mechanism 106, provided for the purpose.

As molds 52—57 are, as clearly appears in Fig. 20, without bottom this primarily, so that the finished product can be ejected through the bottom of each mold, and as the material to be tamped is powdered material and requires initial support in the tamping operation, and as considerable force is required to drive the carbon pencil into a previously tamped bobbin, it is necessary that support or trackway be provided beneath the molds while they are under the tamping mechanisms and while they are under the carbon inserting mechanisms. Such trackways, one for each side of the machine, designated 108 and 110, are clearly shown in Fig. 4. It is desirable that these trackways be adjustable so as to allow for the insertion of molds of different vertical heights in the wheel 50. Such trackways 108 and 110 shown in Figs. 2 and 4, are vertically supported on rods 112, vertically adjustable from brackets 114, rising from the base 64 through the agency of thumb screws 116. By properly manipulating these adjusting devices, trackways 108 and 110 may be adjusted as desired with reference to the under surface of the rotating table 50.

As the material which goes into the finished cores or bobbins is made up of chemicals which have a capability of seriously corroding ordinary metal, it is desirable that these trackways 108 and 110, and also the molds 52 and 57, be made of non-corrosive material.

*Tamping mechanism.*

On each side of the lower portion of the main frame casting 82 is a split ring 118, formed integral therewith, and cut to receive and hold one of the hoppers 58 or 59, as the case may be, the ring being gripped upon the hopper by the use of a suitable tension bolt 120, (Fig. 2). This ring is made adjustable to afford ready removability of a given hopper when it is desired to change the size of the hopper by substituting a new hopper as is frequently required when a change is to be made in the size of core to be tamped. Generally speaking, hoppers for different sized products are the same in construction except for the size of the hole 122 in the bottom thereof, which should be the same size and register with the effective interior opening 124 of the mold, say, 52, with which it is to be used. In actual practice, the hopper and the adjacent mold on the rotating table 50 are placed normally in close proximity to each other in somewhat the relation shown in Fig. 7.

Integral with the central upper side portion of the frame 82 and above each adjacent split ring 118, heretofore described, is a bearing block 126, bored out as clearly appears in Fig. 7 to receive a short vertical shaft 128, having rigidly attached to its upper end a worm wheel 130, taking bearing on its side upon the upper surface 132, of block 126. Projecting from one side of the lower end of this shaft 128 is a short crank arm 134, to which is rigidly secured by any suitable means a vertically depending rod in the nature of a crank pin 136 which carries an agitating tool 138 so shaped and designed that as shaft 128 is rotated the tool traverses the interior circumference of the adjacent hopper 58, thus cleaning its interior circumference and causing the powdered material which is to be tamped to readily fall downward toward the bottom center of the hopper and thence pass through the opening 122, therein into the central chamber 124 of the mold as 52, which happens at the time to be under the hopper. This worm wheel 130 is rotated by a worm or spiral gear 140, mounted on a shaft 142, driven by a sprocket wheel 144, which is in turn driven by a sprocket chain 146, running over a sprocket pinion 148, mounted upon shaft 98ª, connected to shaft 98, heretofore referred to, through clutch mechanism hereafter described. In the drawings, 98ª is used as a designation for that portion of shaft 98 which drives the agitating mechanism for one hopper, and 98ᵇ is correspondingly used for the other end portion of said shaft 98, which drives the agitating mechanism for the opposite hopper.

The short vertical shaft 128, heretofore described, is perforated in the center so that a vertical rod 150 carrying on its lower end tamping tool 152 adapted to drive pulverized material within the adjacent hopper as 58, into the adjacent mold as 52, can be vertically reciprocated through this shaft. This rod 150 is slidable vertically under the control of mechanism, hereafter described, through the cross head 154, hereafter referred to, and through the outer end of bracket 84, clearly seen in Fig. 2.

Crosshead 154 is made, as clearly appears in Figs. 7 and 10, with a lower block 156 and an upper block 158, through both of which vertical shaft 150 passes, the two blocks being on opposite ends of an open space 160, within which a coiled spring 162, inclosing rod 150, lies. The upper end of spring 162 takes bearing against the lower end of a sleeve or spool 164, freely slidable on shaft 150, but screw threaded into the upper block 158 and detachably held in place in adjusted position with reference thereto by any suitable means, such, for instance, as a setscrew device 166, (Fig. 7). The lower end of spring 162 takes bearing against a split collar 168, rigidly but detachably secured upon shaft 150 by any suitable means such, for instance, as the counter sunk screws 170. The result of the construction just described is that spring 162, bearing upon split collar 168, rigid on shaft 150, tends through its bearing upon the underside of spool 164, loose on shaft 150, to force the entire crosshead 154 and attached parts upward with reference to shaft 150 until the position of Fig. 7 is reached with the block 156 in contact with split collar 168. This crosshead 154 is slidably guided on a frame bracket 84 by a notched projecting arm 172, sliding upon a suitable track 174, provided for it as shown.

Crosshead 154 is reciprocated vertically by means of a crank pin block 176, slidable crosswise of lower block 156, in a suitably formed recess or track 178, this crank pin block 176 being mounted upon and driven by a wheel 180 rotated by the adjacent end as 98ª of shaft 98. This crank pin block 176 is adjustable as to its throw with reference to the center of wheel 180 by the mechanism shown in Fig. 11 wherein the block 176 is carried upon a bolt 182, slidable radially of wheel 180 in a slot 184 and detachably locked in place by locking plate 186. This plate is selectively securable lengthwise of slot 184 through the agency of dowel pins 188, which may be moved to fit in selected combinations of holes 190, formed in the surface of wheel 180.

It will be seen that rotation of wheel 180 by shaft 98ª, carries block 176 around with the wheel 180, thus causing the block to reciprocate in the recess or track 178 and in so doing to reciprocate crosshead 154 and, consequently, rod 150 vertically, the crosshead and rod moving in unison through the pressure of spring 162 except under the conditions hereafter described.

Pivoted on a projecting bracket lug 192 on the lower block 156 of the crosshead 154 is a vertical arm 194, normally urged in a counter clockwise direction by spring 196. In order to render this vertical arm adjustable lengthwise, in order to take care of the problem which arises when cores of different lengths are to be tamped, this arm 194 is provided with an extension member 198, detachably securable in selected position by means of a suitable set screw 200.

Pivoted upon the split collar 168 at 202 is a bell crank having a short arm 204 and a long arm 206. The arm 204 is of such a length that whenever split collar 168 and consequently rod 150, to which it is attached, is moved upward a sufficient distance against the action of spring 162, the vertical arms 194 and 198 can be swung in a counter-clockwise direction by spring 196 under the end of this bell crank arm 204, with the result that the bell crank is rotated in a counter clockwise direction to move rod 208 toward the center of the machine, thus swinging lever 210 pivoted at 211, also toward the center of the machine to disengage the clutch mechansim hereafter described, located in shaft 98 to thus stop the tamping mechanism. The movement just described takes place under the action of the downward movement of vertical rod 150 whenever the free end of bell crank arm 204 just hooks over the outer end of part 198 on lever 194.

The reason for the installation of the mechanism just described is that when material to be tamped, commonly called mix, is inserted in one of the hoppers as 58 and the vertical shaft 150 is reciprocated, the tamping tool 152 gradually forces the mix down into the interior of the adjacent mold, as 52. As the mold fills up, the tamping tool, of necessity, is prevented from passing as deeply into the mold as it did earlier in operation, and this change in the stroke of the tamping tool continues progressively until the mold becomes filled with mix. When the mold is filled it is desirable that the tamping operation shall stop because otherwise some of the mix would be forced out and wasted and, furthermore, apart from this, more or less of a strain would be put upon the machine if it continued operating with an over-filled mold. The structure just described is therefore provided and so adjusted that when the mold has been filled with material to be tamped to exactly the right quantity and it has been tamped to the right density, the tool 152 will then be elevated to just the right position so that the arm 194 can swing over to and under the elevated bell crank arm 204 to operate the clutch disengaging rod 208 in the manner described.

*Tamping mechanism clutch (shaft 98).*

As has heretofore been suggested and as shown in Fig. 31, the shaft which drives the tamping mechanism is made up of three parts; a central portion 98 and two end portions 98ª and 98ᵇ in alinement with opposite ends of the first shaft 98. The ends proper of shaft 98 are inclosed within and splined to the hubs 212 and 214 of ratchet wheels 216 and 218 clearly appearing in Figs. 2 and 31. Gear 96, heretofore referred to, is splined to shaft 98 between the two hubs just described. Shafts 98ª and 98ᵇ are loosely journaled at their inner ends, *i. e.* ends toward the center of the machine, within the hubs 212 and 214. Each one of these last mentioned shafts has rigidly secured to it by any suitable means such, as screws 220, Fig. 30, a collar 222. Partially surrounding collar 222 is a yoke 224, journaled upon screws 220 as shown, and carrying a dog 226, urged by a suitable spring as 228, into engagement with the teeth of the adjacent ratchet wheel as 218. When dog 226 is in engagement with ratchet 218 shafts 98 and 98ª rotate in unison. When dog 226 is moved against the action of spring 228 out of engagement with ratchet 218, shaft 98ª remains still while shaft 98 rotates. It is this disconnection of shaft 98ª from shaft 98 which is effected by the movement of rod 208 in the manner heretofore described when the tamping of a core is completed.

As has heretofore been described, the machine is capable of tamping two cores at a time, one in hopper 58, the other in hopper 59, and when a core has been tamped in a mold below each such hopper, it is moved to the adjacent carbon pencil inserting mechanism, requiring a partial rotation of table 50. It has also been explained that a given tamping mechanism should not be allowed to work upon a given core after that core is completed. As the materials worked upon are of a character and handled under conditions which render automatic completion of two cores at the same instant impossible, it is necessary to provide means which will first:

Disconnect the tamping mechanism for each core as soon as that core is completed and which will prevent the starting of the mechanism which rotates the table prior to the completion of the tamping operation in both of the hoppers. The mechanism which performs this function comprises the following:—

On the front of the frame of the machine is a solid member 230, within which is journaled a wheel 232 in operative connection in the manner hereafter described, with the table rotating mechanism. This wheel 232 carries on its upper surface an annular flange 234, having on opposite sides slots 236 through which locking bars 238 and 240 connected to opposite halves of the machine, are respectively adapted to slide. When these bars are in the position shown in Figs. 26 and 28, with reference to the wheel 232, the wheel and consequently, the table rotating mechanism cannot move.

These bars 238 and 240 are, however, provided with suitable notches 242 which, when moved to the position shown in Fig. 27, register with the flange 234 of wheel 232 and, therefore, permit, in this position, free rotation of wheel 232, and consequently, of the table 50 in the manner hereafter described. If one of these bars 238 or 240 is in such a position that its notch 242 would not register with the flange of the wheel, wheel 232 cannot be rotated and consequently, the table cannot be rotated no matter what may be the position of the other bar with reference to the wheel.

Each one of these locking bars is also provided with a cam notch 244 entered by a vertically movable plunger 246, provided at its upper end with a suitable roller 248, and engaging at its lower end a lever arm 250 or 252 as the case may be, (they being identical but located on different sides of the machines) controlling the tamping mechanism clutch throw out.

The clutch throw out mechanisms are independent one for each side of the machine and are mounted upon a shaft 254 (Figs. 28 and 29.) Such mechanism controlled by a lever 250, comprises, in addition to said lever, a cam lever 256 terminating in the particular case here illustrated in the finger 258, the cam lever being held in rigid adjustment with reference to lever 250 by suitable set screw 260, and pressed into engagement with the outer circumferential surface of ratchet wheel 218 by a spring 262 and released from that position by the downward pressure of plunger 246 when forced to the position of Fig. 26 by the lateral movement of the locking bar 238. The side or cam face 264 is so shaped that when cam lever 256 is dropped onto the circumference of ratchet wheel 218, said cam face 264 engages the adjacent dog 226 and forces it out of engagement with the ratchet teeth of ratchet wheel 218, thus throwing out the tamping mechanism in the manner heretofore described.

The bar 238 is operated by rod 208 through the agency of the pivoted lever 210 connected at its middle to the rod 208 whose free end 268 bears against the end of locking bar 238.

To summarize the above operation, assume that the tamping operation is completed, that spring 162 is compressed as heretofore described, so that the end of member 198 hooks under bell crank arm 204. The attempted upward movement of shaft 150 rocks bell crank arm 206 in a counter clockwise direction, as viewed in Fig. 10, thus moving rod 208 to the left, as there viewed in Fig. 28. This moves the free end 268 of lever 210 to the left, as viewed in Fig. 28, thereby correspondingly moving locking bar 238. This movement of this bar carries it from the position of Fig. 26 to that of Fig. 27, doing two things, first putting notch 242 in such a position that wheel 232 can rotate and second, putting cam notch 244 in such a position that plunger 246 moves upward to the position of Fig. 27, thus releasing arm 250 which, under the action of spring 262 presses cam lever 256 down onto the circumference of ratchet gear 218 to engage and throw out dog 226 and stop the tamping mechanism.

Wheel 232, heretofore described, is rigidly mounted on the upper end of a vertical shaft 270, equipped with a spring 272, so mounted that when viewed in plan view the spring tends to rotate shaft 270 in a counter-clockwise direction, through a comparatively small angle, that is rotating shaft 270 in the direction of the arrow of Fig. 32, a sufficient distance to release certain locking devices for the table operating mechanism hereafter described. This spring 272 holds this shaft 270 in this position until such time as the shaft 270 is rotated by mechanism controlled by the moving table 50, contrary to said spring 272, back to the position shown in Fig. 28, where the locking bars 238 and 240 can be and are moved back into locked position of Figs. 26 and 28.

These locking bars 238 and 240 are restored to such locked position by the following mechanism:—

On the under side of frame portion 230, as clearly appears in Figs. 26 and 27, are pivoted at 274 and 276 respectively, bell cranks 278 and 280, each having a vertical arm connected to one of the locking bars 238 and 240 as shown. The other arm of bell crank 280 is, as shown in Figs. 21 and 22, connected by a link 282 to a sleeve 284, vertically slidable upon a stationary fixed support 286, within which shaft 270 is journaled. Pivotally connected at 288 to the opposite side and end of sleeve 284 is a rod 290 whose lower end slides telescopically on a pin 292, by whose side is another pin 294, parallel thereto. The free end of bell crank 278 is pivotally connected at 296 to a rod 298, substantially identical with rod 290, whose lower end telescopes on said pin 294. These two pins 292 and 294, are, as clearly appears in Fig. 21, terminal ends of a U shaped member 300, whose lower portion is pivoted at 302 on a lever 304. This lever is pivoted at 306 upon a bracket 308, depending from flange 80ᵃ, of frame member 80, heretofore described. Bracket 308 carries a pin 310, which enters a slot 312 in lever 304, thus limiting the movement of U shaped member 300 and preventing the rods or pins 292 and 294 from dropping out of the ends of rods 290 and 298. On the under side of lever 304 is a triangular cam member 314, adapted, as the table 50 rotates, to successively engage cam members 316 of which there are six, one for each mold, 52 and 57, heretofore described.

When the finishing of the tamping operations in the two tamping mechanisms move levers 210 independently as heretofore described, to respectively move the locking bars 238 and 240 inward to the position where they unlock wheel 232 in the manner described, the movements of the locking bars 238 and 240 drop the rods 290 and 298, respectively, downward until they reach the bottoms of and cover the pins 292 and 294, and take bearing upon the enlarged ends 318 of the U shaped sides of the member 300. In this position the lever 304 is dropped as far as the slot 312, operating in connection with pin 310, will allow the lever to go. When now the rods 290 and 298 are in depressed position with lever 304 at its lowest position and the table 50 is rotated in a counter clockwise direction as viewed in Fig. 1, one of the cams 316 starting in a position at the left of that shown in Fig. 24, strikes the left hand inclined cam face of cam member 314 and forces the cam and consequently, lever 304 upward until the lower point of the cam 314 is high enough so that cam 316 passes under it to the position of Fig. 24. This operation raises lever 304, U member 300, rods 290 and 298, and consequently, restores locking bars 238 and 240 to the normal locked position of Figs. 26 and 28, the shaft 270 having been by mechanism, hereafter described, simultaneously rotated in a clockwise direction against the action of spring 272 so that the locking bars 238 and 240 can slip into the slots 236 in flange 234 of wheel 232.

Table actuated mechanism.

As heretofore stated, the source of power for actuating the table is delivered through pinion 100 and gear wheel 102, which rotates continuously. As there are six independent molds and the table only moves after the operation which is being performed on each particular mold is completed, and is then only moved until a given mold reaches the next operating mechanism around the circumference of the machine, it is, in the particular machine here shown, necessary that the table move exactly one-sixth of a revolution at each operation and then stop until the machine has completed another cycle of operation before it is started again. In order to provide for this one-sixth rotation, a ratchet cam 320, clearly shown in plan view Fig. 5, is attached to the table 50 by any suitable means such, for instance, as key 322. This cam 320 has on its circumference six teeth 324, having radial notched faces 326 as shown. The circumferential face of each tooth 324 is divided into two parts, a practically circular face 328 and a somewhat sharply inclined face 330, connecting face 328 with radial face 326. The lower portion of shaft 270, heretofore described, is located adjacent to the face of this cam and carries a ratchet dog 332, urged into contact with the surface of cam 320 by spring 272, heretofore described. This dog 332 is so shaped as shown in drawings that when it is moved to the dotted line position shown in Fig 4, the outer face 336 of its operating tooth is in substantial alinement with the adjacent circular face 328 of the adjacent tooth 324 of the ratchet cam 320, as shown in Fig. 45, the result being that any exterior object such as a roller or hook traveling on the face of the cam when stationary, when in this position with reference to the dog, will travel backward and forward over the circular portion of the cam face and the outer face 336 of this dog, without entering and engaging tooth 326 in the cam. This dog 332 is also so shaped that when the circular face 328 of cam 320 passes under the inner face 338 of the operating tooth of dog 332, it will force the dog outward to the position shown in Fig. 45, against the action of spring 272. It is this throwing out of this dog to this position of Fig. 45, (dotted line position Fig. 4), which rotates shaft 270 against the action of spring 272 back to the position where locking plates 238 and 240 can move back to the position of Figs. 26 and 28 in the manner heretofore described. When, on the other hand, the completion of the two tamping operations releases these locking plates 238 and 240, the spring 272 rotates the shaft 270 and presses the inner face 338 of the dog 332 into the adjacent notch in the cam as shown in Fig. 5, and thus allows operating hook 340 to take hold.

This operating hook 340 is pivoted upon a pin 342, which joins link 344 with connecting rod 346. Link 344 is pivoted at 348 to frame member 80ª. Connecting rod 346 is pivoted at 350 to wheel 102. Operating hook 340 is connected to link 344 by a spring 352 as clearly appears in Fig. 5 which spring is of sufficient tension to hold the hook 340 in operative contact with the circumferential surface of cam 320, and causes the end of the hook to drop into engagement with successive faces 326 thereof, as shown in Fig. 5, whenever dog 332 is moved to the position of Fig. 5, and to cause it to travel reciprocatingly along the alined outer faces 328 of the cam and 336 of the dog in the manner described during the time the dog is in locked position under the control of bars 238 and 240.

In the operation of this part of the device, wheel 102 rotates continuously, thus continuously reciprocating tooth or hook 340 along the adjacent outer surfaces of the cam and dog. When the locking bars 238 and 240 operate as described, and allow dog 332 to assume the position of Fig. 5, spring 352 immediately forces the hook 340 to the position of Fig. 5. The next half revolution of wheel 102 moves hook 340 a sufficient distance to rotate cam 320, and consequently, table 50 one-sixth of a revolution. At the close of this stroke, dog 332 is returned to its normal position shown in dotted lines Fig. 4, so that when the next half revolution of wheel 102 returns hook 340 to its starting point, it cannot again actuate the table until the dog 332 has been again released through the action of the locking bars 238 and 240.

Table lock.

In order that the device may operate properly it is desirable, if not necessary, that the table be rigidly locked against rotation while the tamping core inserting and ejecting mechanisms are in actual operation and that said locking mechanism be released when the table is to be rotated. This function is accomplished by providing in a suitable portion of frame member 80ª a vertically reciprocatable lock bolt, 354, clearly shown in Figs. 32 and 44. Suitably pivoted to the frame as at 356 is a bell crank having one arm 358 engaging the bolt 354 in a suitable slotted connection 360, as shown in Fig. 44, while the other bell crank arm 362 has its free end connected to a spring 364, whose opposite end is connected to the rear end of ratchet dog 332. On this last mentioned bell crank arm is a cam face 366, which is engaged by the rear end of dog 332, when the dog is rotated by shaft 270, to rotate bell crank 362—358 in a clockwise direction, to raise locking pin 354 out of its adjacent locking hole 368 of which there are six provided in table 50. The movement of the dog 332 elevates pin 354 a sufficient length of time so that the table can start to move. When the table has moved far enough so that latch dog 332 has been returned to normal position, spring 364 acts through the bell crank to urge locking pin 354 downward so that it will drop into the next hole 368 in the table as soon as that hole is reached.

As heretofore stated, one mold, as 52, is tamped full of "mix," the table then starts and moves it to the carbon inserting mechanism 60, where a carbon is inserted, after which it is moved to the ejecting mechanism 62, where it is ejected from the machine. For want of a better known order of procedure, the carbon inserting mechanism will first be described as a more or less separate machine, then the ejecting mechanism, and finally, the mechanism by which these two mechanisms are driven in relationship with the rest of the machine.

*Carbon inserting mechanism.*

This device, heretofore referred to under the general numeral 60, is supported by a portion of the frame bearing that numeral in Fig. 14. It forms the subject matter for a divisional application, Serial No. 452,071, filed March 14, 1921.

Each adjacent carbon inserting and ejecting mechanism is driven by one common shaft 370, there being one such shaft on the front and another on the back of the machine. On the end of such shaft 370, and in a suitable recess in the frame portion 60, is a driving wheel 372. On the face of this wheel 372 is a roller 374, adapted to travel lengthwise of a slot in a crosshead 376. The ends of this crosshead are adapted for sliding engagement in vertical track members 378 (Fig. 12). Rigidly secured to this crosshead and slidably mounted in frame 60 is a vertical plunger 380, whose lower end carries the carbon inserting tool 382. The rotation of the wheel 372 operates through the mechanism just described to properly reciprocate this tool 382 to force a previously prepared carbon pencil 384, fed to it, into the cylindrical tamped core of "mix" 386 to about the depth shown in Fig. 46.

In order to feed the carbon pencils to a position where they can be driven into the previously compressed bodies of depolarizing material, a suitably designed retaining chamber and escapement device is provided. In the particular form of the device illustrated in the drawings, the retaining chamber consists in a tubular member, made partly of glass 388, and partly of metal 390, suitably supported as shown in Figs. 12, 13 and 14 so that its lower end 392 will discharge carbon pencils 384 into the path of travel of the lower end of carbon inserting tool 382. An escapement mechanism for retaining these carbons in the tube and feeding them one at a time is provided, the same in the particular case here shown comprising an escapement lever 394, pivoted at 396, having its upper tooth 398, adapted to enter a suitable slot 400 in tube 390 so as to there engage and press upon one carbon member 384 therein when desired, and having in its lower end an adjustable block 402, detachably securable in place by a screw 404, and carrying a projecting pin 406 entering the path of travel of the bottom carbon pencil 384 within the tube 390. This escapement lever 394 is so adjusted that when upper tooth 398 engages one carbon pencil in the feeding device, pin 406 will be out of the path of travel of the bottom carbon pencil therein, and allow such bottom pencil to drop from tube 390 into the path of travel of tool 382.

The pivot pin or shaft 396, heretofore referred to, is mounted in a bracket 408, surrounding and attached to metal tube 390, as clearly appears in Figs. 13 and 16. Rigidly attached to one end of this shaft 396 is a crank arm 410, having a crank pin 412. Loosely journaled on shaft 396, between crank arm 410 and bracket 408, is another crank arm 414, having a long crank pin 416, which extends outward so that it can be connected with crank pin 412 by a spring 418. This crank pin 416 is also mounted upon the lower end of a vertical driving rod 420, slidable through a bracket 422 on crosshead 376, heretofore referred to. This rod 420 is provided with screw threads 424 along its length on which travel two adjusting nuts 426 and 428, one located above the other below bracket 422. The arrangement of the parts recently described is such that the two crank pins 412 and 416 are always on opposite sides of shaft 396, either above or below the center thereof, and when rod 420 is elevated so as to move crank pin 416 from one extreme position, say, below shaft 396, to the other extreme position, say above this said shaft, the tension of spring 418 automatically correspondingly moves the other crank pin, thus rocking shaft 396 and consequently, tilting escapement lever 394. It is, of course, understood that the escapement lever 394 is rigidly attached to shaft 396 by any suitable means.

In the normal operation of the machine the adjusting nuts 426 and 428 are so placed that when crosshead 376, and consequently bracket 422, reach the upper limit of their vertical movement under the control of shaft 370, they move the parts to the position where escapement 394 releases the bottom carbon pencil 384 from tube 390 and holds the next succeeding carbon above in place, and that when the parts named reach their lower limit of movement, bracket 422 strikes adjusting nut 428 and reverses the position of the escapement, or, in other words, moves it to the position shown in Fig. 14, wherein the lower carbon pencil is supported in its supply tube by pin 406.

If a carbon pencil 384 were allowed to drop from tube 390 directly on to a compressed cylinder of "mix" material 386 in the mold which is below the carbon inserting mechanism, it would not, in the absence of a holding mechanism, necessarily assume such a position that the carbon inserting tool 382 could drive it into the cylinder of depolarizing material. It is, therefore, necessary to provide means by which the carbon pencil as it falls from tube 390 can be retained and held in driving position under the tool 382 until the carbon pencil has entered the cylinder of depolarizing material a sufficient distance to be self-supporting therein. This result is accomplished by providing the special gripping mechanism shown in Figs. 12 and 15.

Slidable crosswise of the machine in a suitable track provided for the purpose, adjacent to the path of travel of the lower end of the carbon inserting tool 382, which track in the case here illustrated takes the form of a triangular notch 430, cut in the frame of the machine, are two blocks or crossheads 432 and 434. Secured to the front faces of these crossheads are gripping jaws 436 and 438, adapted when the crossheads are moved toward each other to embrace and hold the carbon pencil 384 in position under tool 382 and over the cylinder of compressed depolorizing material, into which the carbon is to be inserted. These jaws just described are reciprocated toward each other by a pair of bell cranks 440 and 442, drawn toward each other by a spring 444 and moved in the opposite direction through the agency of a lever 446, one of whose ends engages the bell cranks in slots 448, while its other end carries a roller 450, which travels upon a suitably formed cam surface 451, formed on wheel 372. This cam surface is so positioned and shaped with reference to the adjustment of nuts 426 and 428 and the position of plunger 380 in crosshead 376, that when a carbon pencil 384 has been dropped from tube 390 it is grasped by jaws 436 and 438 and held in vertical position over the mold containing the cylinder of depolarizing material into which the carbon is to be inserted long enough so that as inserting tool 382 begins to descend it can bear upon the upper end of the carbon pencil and start it into the compressed cylinder and that jaws 436 and 438 then withdraw out of the path of travel of tool 382 before that tool reaches a position in its downward stroke where it would otherwise strike and injure the jaws.

In Fig. 14$^a$ is shown a carbon inserting tool 452 for the same purpose as tool 382, having a detachable lower end portion 454, in screw-threaded engagement 456 with tool 452. The object of this construction is twofold. It allows in a given tool adjustment for length by turning member 454 on threads 456, and it permits the total removal of member 454 and the substitution, therefore, of a corresponding member of different length, which substitute member might be required when a product of a different height was desired to be produced by the machine, and it was necessary to change the machine therefor. This capability of substitution also allows for change in the diameter of the tool 454, which most frequently occurs in practice.

Ejecting mechanism.

This part of the mechanism, which is the subject of a divisional application, Serial No. 452,072, filed March 14, 1921, is contained within the portion 62 of the frame of the machine, which early in the specification was used as designating the entire ejector mechanism. Broadly speaking the ejector mechanism consists simply of a reciprocating rod 458, carrying at its lower end a detachable tool 460 adjustable as to size by substitution as in the case of tool 454, and adjustable as to length through the agency of screw threads 462; this in combination with means operated by shaft 370 for at the proper time driving this plunger 458 downward into the registering mold to drive out therefrom the finished product 384—386 into a suitable receptacle or chute 466. The problem, however, presented in working with the particular product produced by this machine requires that the rod 458 with attached tool 460 be given a slight rotary motion as it descends through the mold and that, as the product is released from the mold, it be given a sharp stroke or kick to effectively eject it without injuring the conformation of the compressed cylinder of depolarizing material, which is at the time moist and more or less soft. This result is accomplished by mechanism illustrated in Figs. 18 and 19. A crosshead 468 is provided, guided for vertical movement in any suitable manner, as for instance, by a pin 470, vertically slidable in a suitable slot 472 formed in frame casting 62. This crosshead 468 is connected for reciprocation by shaft 370 by any suitable means such, for instance, as a wheel 474, mounted on the shaft, and a connecting rod 476, attached at one end to the wheel and at the other end to the crosshead. Instead of making rod 458 integral with this crosshead as would do, if rotation of the rod were not required, the rod 458 is made rotatable in the crosshead, being held against longitudinal movement with reference to the crosshead by a grooved wheel 478, rigidly secured on ejector rod 458 by any suitable means not shown in detail. Pivotally mounted on opposite sides of crosshead 468 and in proper relation to grooved pulley 478, are two other pulleys 480 and 482. Traversing these two pulleys 480 and 482 and the interspersed grooved pulley 478, is a coiled spring member 484, attached at one end to the upper portion of the frame 62 by any suitable means, such as screw 486, and at its other end to the lower portion of the frame by screw 488. The result of this construction is that, assuming the parts are in the position shown in Fig. 18 and the wheel 474 is rotated, the crosshead 468 is moved downward. This causes pulleys 478, 480 and 482 to travel along spring 484, but under sufficient frictional engagement so that the pulleys and particularly 478 are rotated, thus slowly rotating member 458—460. As the crosshead descends the frictional engagement of these pulleys with the spring 484 tends to stretch that portion of the spring which is above the pulleys, between them and fastening 486, with the result that when tool 460 has moved through mold 52 sufficiently to eject the product 384—386, this spring is under a severe tension. As the product begins to loosen and leave the mold, this tension of the spring exerts itself to produce a quick pull over the pulleys and thus give tool 460 a quick rotary motion as the finished product leaves the mold, which action in actual practice produces the desired result of a properly finished product member.

*Clutch control for carbon inserter and ejector mechanisms.*

As heretofore stated, each shaft 370 in the machine, drives one carbon inserter mechanism and one ejector mechanism. Each shaft 370 derives its power through a sprocket chain 490, which is driven from shaft 92 through a clutch mechanism which is about to be described. The problem to be solved in this connection develops from the fact that the tamping mechanisms have to run indefinitely until they complete their work in the manner described. The table can only be moved one-sixth of a revolution at a time; the carbon inserting and the ejecting operations require only one revolution of shaft 370, which is in and of itself necessary but must be completed in any event before the tamping operations on the next samples of product being made are completed, and that none of these mechanisms for operating on the product can be allowed to operate while the table is in motion. This problem is solved in this machine by installing intermediate between shaft 92 and sprocket chain 490 a clutch mechanism which automatically stops itself when shaft 370 makes one complete revolution; which is set by the unlocking of the table in such a position that it can start to operate shaft 370, but is not released to operate shaft 370 until the table is in its new position and the locking bolt is finally in place; the mechanism which stops shaft 370 after it completes one revolution, being automatic and independent of all other parts of the machine, including the table.

Mounted upon a bracket 492, located on the frame of the machine at a convenient point with reference to table locking bolt 354, heretofore described, is a rotatable shaft 494, parallel to shaft 92. Shaft 92 has rigid on one end beveled gear 90, on whose back is a ratchet wheel 496. Journaled upon shaft 92, adjacent to this ratchet wheel, is a sleeve 498. Pivoted upon opposite sides of this sleeve 498 is a yoke 500, carrying on its outer end a locking dog 502. Sleeve 498 carries a sprocket wheel, rigid with it, but not shown in detail, over which sprocket chain 490, heretofore referred to, passes from which it will be seen that whenever locking dog 502 is in engagement with one of the teeth of ratchet wheel 496, the rotation of shaft 92 will rotate through chain 490, shaft 370 and attached parts. This ratchet dog 502 is normally urged toward the ratchet wheel 496 by a spring mechanism 504 of construction well known in the art, and therefore not shown in specific detail. In order to hold locking dog 502 out of engagement with ratchet wheel 496, except when it is desired, as stated, to operate the mechanisms driven by shaft 370, a yoke 506 illustrated in perspective in Fig. 39 is loosely mounted on shaft 494, and provided on its face with a cam notch 508 within which dog 502 may rest as shown in Figs. 34 and 35, and be held out of engagement with ratchet wheel 496. This yoke 506 is supposed to drop down to the position of Figs. 34 and 35 by gravity, but to make sure of its so dropping in any event a suitable spring 510 is provided, adapted to urge the yoke to rotate in a clockwise direction, as viewed in the figures. This yoke 506 is provided with a curved face 512 so shaped with reference to the center about which the yoke swings on shaft 494, that when the yoke is raised to the position shown in Fig. 36, locking dog 502 can swing in a plane perpendicular to the drawing as illustrated in these figures from the position of Fig. 34 to that of Fig. 36, in which dog 502 engages the ratchet teeth of wheel 496, and can rotate in that position with reference to the ratchet wheel in a counter clockwise direction until the dog 502 has swung the yoke downward and finally passes beyond the lower extremity 514 of the yoke.

The front face of this yoke as viewed in the drawings, is provided with a radial slot 516, within which a locking block 518 is adapted to reciprocate, being moved outward or to the right as viewed in the figures, by a spring 520, and being limited in its outward movement by a retaining device such as a pin 522, entering a slot 524. Also in the front face of the yoke is a curved slot 526, drawn about the center of shaft 494. Slot 524, heretofore referred to, in locking block 518 is adapted to register with this slot 526 when the parts are in the position shown in Fig. 34. The front face of the yoke 506 is also provided with a recess, within which is pivoted on a screw 530, a lever 532. This lever 532 is so located that when it is in the position shown in Fig. 36 it is adapted to be engaged by the end of locking dog 502 and as locking dog 502 passes over it, force locking block 518 from the position of Fig. 36 back to that of Fig. 34.

Rigidly secured upon shaft 494, for instance, by pin 534, is a lever arm 536 on whose face, adjacent to yoke 506, is a lifting lug 538, adapted to travel through slots 526 and 524, to assume the position shown in Fig. 34, and adapted as lever arm 536 moves to the position of Fig. 35 to leave slot 524 and allow locking block 518 to move to the position of Figs. 35 and 36.

Rigidly mounted on shaft 494 is a lever arm 540, engaging at its outer end table locking bar or pin 354 in such a way that reciprocation of said pin 354 rocks this lever 540 and consequently shaft 494, and consequently lever arm 536.

Assuming now that the table is locked and that shaft 270 and attached parts are not under power, but that shaft 92 is rotating continuously. The parts under discussion are then in the position shown in Fig. 34, with dog 502 in notch 508, and thus held out of engagement with ratchet wheel 496. Assume now that a given set of tamping operations is completed, and that shaft 270 is operated in the manner heretofore described, to raise table locking bolt 354 and to start the rotation of the table. This elevation of locking bolt 354 puts the parts in the position of Fig. 35, in which lifting lug 538 has moved downward and released locking block 518 so that it has moved outward under spring 520, and driven lever 532 to the right into the future path of travel of dog 502. Dog 502 is, however, in this position still held locked in notch 508 of yoke 506. The mechanism is thus set for operation, but cannot operate until table locking bolt 354 has been returned to normal locked position. This situation prevents any operation of the carbon inserting mechanism and the ejecting mechanism while the table is in motion. When now the table completes its one-sixth revolution in the manner heretofore described, the movement of locking bolt 354 in returning to locked position with reference to the table moves lifting lug 538 up slot 526 until it strikes block 518, whereupon it lifts the entire yoke device upward so that locking dog 502 first slips out of notch 508, and jumps into engagement with ratchet wheel 496 which moves that dog to and beyond the position of Fig. 36. As dog 502 moves downward as viewed in Fig. 36, it forces lever 532 inward to thus force locking block 518 to the left as far as it is shown in Fig. 34. At this instant the entire yoke 506 with attached parts drops under the action of gravity and the spring 510, as far as it can ever go, thus bringing lug 538 into position of Fig. 34 to hold lock 518 in the position of Fig. 34, wherein locking pin 354 and lever 540 can move upward without interfering with or interference by yoke 506. The yoke having thus dropped, it is in such a position that when dog 502 completes its revolution it again engages notch 508, thus throwing it out of mesh with ratchet wheel 496, and stopping the rotation of shaft 370 and attached parts.

Stated another way, yoke 506 is a gravity actuated clutch hold out member normally loose upon shaft 494 and pressed downward by spring 510. In order to move this yoke to let the clutch operate, it has to be elevated against gravity and said spring 510. The moving part which performs this operation is the locking bolt 354 and under the law of the machine, it has to do this as it is descending into locked position, but it must not effect the normal position of the yoke when it (the locking pin) is being elevated. And conversely, the yoke must not prevent upward movement of pin 354. This result is accomplished by the parts moving, as described, in such a way that when pin 354 descends, it can, through lifting lug 538 and block 518, lift the yoke, while when pin 354 is moving in the opposite direction, these parts 538 and 518 are capable of moving to the position of Fig. 34, withstanding the fact that the yoke 506 is throughout this latter operation, in its lowest or normal position.

*General operation.*

In the complete operation of the machine, the operator keeps the hoppers 58 and 59 on opposite sides of the machine, supplied with a sufficient quantity of depolarizing or other material to be tamped. He also keeps the carbon pencil retaining tubes 388—390 reasonably well filled with carbon pencils ready to be inserted in the cylinders of compressed "mix" as the machine operates. If the machine is operating very rapidly two or more operators might be required, to do this properly. Power is now applied to rotate pulley 78 continuously as long as it is desired to run the machine. Under these conditions the tamping mechanisms force powdered material down into the respective molds which are under said tamping mechanisms. On the completion of the proper tamping of both of the cores in their respective molds, the tamping mechanisms automatically move locking bars 238 and 240 in the manner described, to release wheel 232, thus permitting spring 272 to partially rotate shaft 270 to manipulate dog 322 to permit hook 340 to take hold of the adjacent tooth on ratchet cam 320, and thus begin to rotate the table. On completion of a one-sixth revolution of the table, ratchet dog 332 has asumed the position where the table can not be rotated further, and the locking pins 354 fall into the next succeeding holes 368, and thus lock the table in a stationary position. This re-insertion of the locking pins 354 operates the clutch mechanism of Figs. 34—36 to operate the carbon inserting and the ejecting mechanisms. The movement of the table has also caused cam 314 to pass over cam 316, and thus re-lock wheel 232, whereupon the device is ready for another cycle of operation.

*Additional comments.*

The operation of the machine, as heretofore described, in relation to Figs. 18 and 19, wherein the tool 460 ejects the finished bobbin 386 through the bottom of the mold, performs a very meritorious function upon this finished product, in that the act of ejecting the finished member, which fits more or less tightly in the mold, serves to thoroughly compress the depolarizing mixture of member 386 about the carbon pencil 384 after it has been inserted therein, and thus do away with any roughness or damage which has taken place during the insertion of the carbon pencil in the bobbin of mix.

It will be noticed from an inspection of Fig. 2 that the bottoms of the hoppers 58 and 59 approach quite closely the tops of the molds carried by the table which happen to be adjacent to these hoppers. This relationship is of some importance in that the bottoms of the hoppers without being sharpened at all, serve as shear members to smooth off the tops of the initially formed bobbins, should the last tamping stroke or two of the tamping tool force a somewhat unbroken lump of depolarizing material on to the top of the bobbin just as the tamping operation ceases.

In connection with Fig. 10, it may be stated that the split collar 168 has projecting from it a lug 169, located slightly above the normal position of bell crank arm 204, which serves to hold vertical arm or lever 194 clear of short bell crank arm 204, as clearly shown in Fig. 10, until such time as the compression of spring 162 in the tamping operation has raised the bell crank high enough so that vertical arm 194 is ready to swing under bell crank arm 204, whereupon it clears this lug 169 and engages the bell crank arm, as heretofore described. This structure prevents unsatisfactory operation of the device which might occur if the upper portion 198 of arm 194 constantly engaged bell crank arm 204 as the tamping plunger 150 moves upward.

Having thus described my invention, what I claim as new and desire to secure by Letters Patent, is:—

1. In a device of the class described, a tamping machine adapted to insert powdered material in a mold and tamp it by a plurality of successive taps, a carbon injecting machine adapted to insert a carbon pencil in a mold containing previously tamped powdered material, an ejecting mechanism adapted to eject from a mold a finished core containing a carbon therein produced by the first two machines, means for progressively supplying a plurality of molds to said three machines, and automatic means for operating all of the parts named in proper sequence to produce the product.

2. In a device of the class described, two groups of machines, each comprising a tamping machine, a carbon inserting mechanism and an ejecting mechanism, a work carrier adapted to present molds to each machine of each unit, means progressively moving the work carrier for this purpose, a power supply, an automatic clutch operating and locking mechanism primarily independently controlled by the two tamping mechanisms so arranged that the machine automatically produces the described product 3. In a device of the class described, a work carrier, a plurality of molds thereon adapted for successive placement before a tamping machine adapted to insert powdered material in a mold and tamp it by a plurality of successive taps, a carbon inserting machine and an ejecting machine, such machines being located along the carrier, means supplying power for each of said machines and for the carrier, clutch devices controlling the supply power to each of said parts, and a control mechanism for said clutch devices automatically started by the tamping mechanism when it has completely and properly finished its work, for the purposes set forth.

4. In a device of the class described, a rotatable table carrying a plurality of molds, a tamping machine, a carbon injecting machine and an ejecting machine arranged at equal intervals around the table, means supplying power to rotate said table, means stopping said table when it has traveled the interval between two successive machines, clutch controlled mechanism for supplying power to each of said three machines, and means solely under the control of the tamping machine for causing said clutch devices to operate to first move the table and then operate each of said three machines.

5. In a device of the class described, a rotatable table provided with six equally spaced molds, two tamping machines on opposite sides of the table, two oppositely placed carbon injecting machines 60 degrees therefrom around the table, and two oppositely disposed ejecting machines 60 degrees farther on around the table; independent means for supplying power to each tamping machine, a clutch for each tamping machine, means for detaching each such clutch, operated by the adjacent tamping machine when its work of tamping material in an adjacent mold on the table has been completed, means driving each adjacent injecting machine and ejecting machine simultaneously so that each makes one complete revolution only, a clutch device for supplying power to so operate the last two mentioned machines, mechanism capable of rotating the table, mechanism for stopping and locking it when it has moved sixty degrees, and mechanism under the joint and several control of the tamping mechanisms controlling the movement of the table and the starting of the injecting and ejecting machines, for the purposes set forth.

6. In a device of the class described, in combination with a work carrier, means for intermittently moving it, a series of molds on the work carrier adapted to be progressively moved, a tamping mechanism adjacent to one mold position on the work carrier adapted to insert powdered material in a mold and tamp it by a plurality of successive taps, a carbon inserting mechanism adjacent to the next mold position on the carrier, an ejecting mechanism adjacent to the next mold position on the carrier, and automatic means for progressively feeding said work carrier along and properly operating said machines to tamp powdered material in the first mold, insert a carbon in the previously tamped core in the second mold, and eject the finished core with carbon in it from the third mold, for the purposes set forth.

7. In a device of the class described, in combination with two shafts, interfitting clutch members, one on each, a tamping machine driven by one shaft, power supplied to the other shaft, a throw out member movable with reference to the shaft to separate the clutch members, a cam mechanism for moving said throw out member to separate the clutch members, a tamping bar in the tamping machine automatically adjustable in position as the thickness of the work it is doing increases, mechanism adapted to move said cam mechanism controlling the throw out member which separates the clutch members, and a starting mechanism between said last mentioned mechanism and the tamping bar adapted to be set in operation only when the tamping bar finishes its work.

8. In a device of the class described, in combination with two shafts, interfitting clutch members, one on each, a tamping machine driven by one shaft, power supplied to the other shaft, a throw out member movable with reference to the shaft to separate the clutch members, a cam mechanism for moving said throw out member to separate the clutch members, a tamping bar in the tamping machine automatically adjustable in position as the thickness of the work it is doing increases, mechanism adapted to move said cam mechanism controlling the throw out member which separates the clutch members, a starting mechanism between said last mentioned mechanism and the tamping bar adapted to be set in operation only when the tamping bar finishes its work, a work carrier member adapted to move successive pieces of work under said tamping bar, means for actuating said work carrier, means for locking said work carrier in stationary position, and means, operated in conjunction with the cam mechanism which releases the throw out member, releasing the locking mechanism for the carrier mechanism.

9. In a device of the class described, the combination of a power supply shaft, two other shafts, clutches between each and the power shaft normally in operating position, a throw out device for each clutch, a cam controlling each throw out device adapted to cause the disengagement of its adjacent clutch, a pair of tamping machines driven one each by each of the second mentioned shafts, a work carrier device adapted to supply work to each of said tamping machines, means driving said work carrier, means locking said work carrier, a cam mechanism driven by each tamping machine operatable by the machine when it finishes its own tamping operation to throw out its own clutch, and means coöperating with the cam throw out mechanism and the work carrier lock adapted to release said lock and start the carrier as soon as both said clutches are released.

10. In a device of the class described, in combination with two alined shafts, interfitting clutch members, one on each, a tamping machine driven by one shaft, power supplied to the other shaft, a throw out lever pivoted at one side of the shaft normally urged to separate said clutch members, a cam mechanism normally holding said throw out member out of engagement with the clutch member, a tamping bar in the tamping machine, means adjusting said tamping bar to the work being tamped, mechanism operating said cam hold out mechanism, set in motion by said tamping bar when it reaches a given position in its work, for the purposes set forth.

11. In a device of the class described, in combination with a suitable support, a crosshead slidable thereon, means for reciprocating the cross-head, a tamping bar slidable through the cross-head and support, a compressible spring in the cross-head bearing on one end thereof, a collar on the tamping bar engaged by the other end of said spring, a bell crank member on said collar having one arm adapted for connection to a mechanism to be controlled, a latch member pivoted on the cross-head adapted for engagement with the other arm of the bell crank, the length of the latch member being in proportion to so engage the bell crank when the tamping bar has operated to a predetermined point, for the purposes set forth.

12. In a device of the class described, in combination with a suitable support, a crosshead slidable thereon, means for reciprocating the cross-head, a tamping bar slidable through the cross-head and support, a compressible spring in the cross-head bearing on one end thereof, a collar on the tamping bar engaged by the other end of said spring, a bell crank member on said collar having one arm adapted for connection to a mechanism to be controlled, a latch member pivoted on the cross-head adapted for engagement with the other arm of the bell crank, the length of the latch member being in proportion to so engage the bell crank when the tamping bar has operated to a predetermined point, and spring mechanism urging said latch member into engagement with the bell crank, for the purposes set forth.

13. In a device of the class described, in combination with a suitable support, a crosshead slidable thereon, means for reciprocating the cross-head, a tamping bar slidable through the cross-head and support, a compressible spring in the cross-head bearing on one end thereof, a collar on the tamping bar engaged by the other end of said spring, a bell crank member on said collar having one arm adapted for connection to a mechanism to be controlled, a latch member pivoted on the cross-head adapted for engagement with the other arm of the bell crank, the length of the latch member being in proportion to so engage the bell crank when the tamping bar has operated to a predetermined point, and means holding said latch member out of engagement with the bell crank arm until the parts have reached approximately the position for engagement of the latch and bell crank arm.

14. In a device of the class described, in combination with a suitable support, a crosshead slidable thereon, means for reciprocating the crosshead, a tamping bar slidable through the cross-head and support, a compressible spring in the cross-head bearing on one end thereof, a collar on the tamping bar engaged by the other end of said spring, a bell crank member on said collar having one arm adapted for connection to a mechanism to be controlled, a latch member pivoted on the cross-head adapted for engagement with the other arm of the bell crank, the length of the latch member being in proportion to so engage the bell crank when the tamping bar has operated to a predetermined point, and a lug on the collar holding said latch member out of engagement with the bell crank arm until the parts have reached approximately the position for engagement of the latch and bell crank arm, for the purposes set forth.

15. In a device of the class described, in combination with a suitable support, a crosshead slidable thereon, means for reciprocating the cross-head, a tamping bar slidable through the cross-head and support, a compressible spring in the cross-head bearing on one end thereof, a collar on the tamping bar engaged by the other end of said spring, a bell crank member on said collar having one arm adapted for connection to a mechanism to be controlled, a latch member pivoted on the cross-head adapted for engagement with the other arm of the bell crank, the length of the latch member being in proportion to so engage the bell crank when the tamping bar has operated to a predetermined point, means holding said latch member out of engagement with the bell crank arm until the parts have reached approximately the position for engagement of the latch and bell crank arm, and spring mechanism urging said latch member into engagement with the bell crank.

16. In a device of the class described, in combination with a suitable support, a crosshead slidable thereon, means for reciprocating the cross-head, a tamping bar slidable through the cross-head and support, a compressible spring in the cross-head bearing on one end thereof, a collar on the tamping bar engaged by the other end of said spring, a bell crank member on said collar having one arm adapted for connection to a mechanism to be controlled, a latch member pivoted on the cross-head adapted for engagement with the other arm of the bell crank, the length of the latch member being in proportion to so engage the bell crank when the tamping bar has operated to a predetermined point, a lug on the collar holding said latch member out of engagement with the bell crank arm until the parts have reached approximately the position for engagement of the latch and bell crank arm, and spring mechanism urging said latch member into engagement with the bell crank.

17. In a device of the class described, in combination with a support, a reciprocatable cross-head and means for reciprocating it with reference to the support, a tamping bar slidably mounted with reference to the cross-head, a yielding spring mechanism interposed between the tamping bar and one end of the cross-head, permitting yielding movement of the tamping bar with reference to the cross-head as the tamping operation progresses, and means operating another part of the machine set in operation as the spring reaches its maximum compression.

18. In a device of the class described, in combination with a suitable support, a cross-head slidable thereon, means for reciprocating the cross-head, a tamping bar slidable through the cross-head, and support, a compressible spring in the cross-head tending to hold the tamping bar in a given position with reference to the cross-head and to yield under pressure as the tamping operation continues, a lever device bodily movable with the tamping bar, connected at one end to a given mechanism to be operated, and a latch member adapted to engage the lever mechanism to cause it to operate when the movement of the tamping bar has compressed the spring to a given point.

19. In a device of the class described, in combination with a suitable support, a cross-head slidable thereon, means for reciprocating the cross-head, a tamping bar slidable through the cross-head and support, a compressible spring in the cross-head tending to hold the tamping bar in a given position with reference to the cross-head and to yield under pressure as the tamping operation continues, a lever device bodily movable with the tamping bar, connected at one end to a given mechanism to be operated, a latch member adapted to engage the lever mechanism to cause it to operate when the movement of the tamping bar has compressed the spring to a given point, and means for adjusting the length of said latch member.

20. In a device of the class described, in combination with a suitable frame, a cross-head and tamping bar carried by the cross-head, a wheel adjacent to the cross-head, a block on the wheel movable in a notch in the cross-head, and means for selectively adjustably positioning the block with reference to the wheel, whereby the stroke of the tamping bar may be regulated with reference to the stroke of the wheel.

21. In a device of the class described, in combination with a hopper within which material is to be tamped, a vertically reciprocatable tamping bar, movable with reference to the hopper, means for reciprocating said tamping bar, a rotatable member surrounding said tamping bar through which it slides, means connected to the means which reciprocate the tamping bar for rotating said member around the tamping bar, and an agitator member connected to the rotatable member, adapted under the control of the mechanism set forth, to rotate continuously around the tamping bar as it reciprocates.

22. In a device of the class described, in combination with a rotatable table, a plurality of molds open at top and bottom, arranged around the table, means in one location for inserting material in said molds from the top, means tamping said material by a plurality of successive taps, means in another position for ejecting said material from the bottom of the mold, and a support under the table in the first position to retain said material in said mold during the first operation and clear of the position where the second operation is performed.

23. In a device of the class described, the combination of a movable carrier member provided with molds open at top and bottom, a supporting plate beneath said carrier member along a portion of its path of travel adapted to approximate the bottoms of the molds thereon, whereby material may be packed in said molds when adjacent to said plate and supported thereby, and means adapted to pack material in one of said molds by a plurality of successive taps, for the purposes set forth.

24. In a device of the class described, the combination of a movable carrier member provided with molds open at top and bottom, a supporting plate beneath said carrier member along a portion of its path of travel adapted to approximate the bottoms of the molds thereon whereby material may be packed in said molds when adjacent to said plate and supported thereby, means adapted to pack material in one of said molds by a plurality of successive taps, and means for adjusting said plate toward and from said carrier member, for the purposes set forth.

25. In a device of the class described, in combination with a movable carrier member, a plurality of molds with open top and bottom and carried by said carrier members, means at two points in the path of travel of the carrier member for inserting material into said molds from the top, means adapted to pack material in two such molds by a plurality of successive taps, means at another point in the path of travel in the carrier member for ejecting said material from the bottom of said molds, and a supporting plate under said carrier member adjacent to the bottoms of said molds extending from the position of the first to the second inserting means, for the purposes set forth.

26. In a device of the class described, in combination with a movable carrier member, a plurality of molds open top and bottom on and carried by said carrier member, means at two points in the path of travel of the carrier member for inserting material into said molds from the top, means adapted to pack material in two such molds by a plurality of successive taps, means at another point in the path of travel in the carrier member for ejecting said material from the bottom of said molds, a supporting plate under said carrier member adjacent to the bottoms of said molds extending from the position of the first to the second inserting means, and means for adjusting said plate with reference to the carrier member, for the purposes set forth.

27. In a device of the class described, the combination with a movable work carrier having molds thereon, a pair of tamping machines adjacent to the work carrier adapted to each work upon a mold brought to it by said work carrier, means for moving the work carrier to supply molds in succession to said tamping machines, a starter mechanism normally urged to permit the movement of the work carrier, a movable member rotatable by the starter mechanism, a pair of locking bars interfitting with irregular parts on said movable member, and means connecting each locking bar to its adjacent tamping machine, adapted to be actuated by said tamping machines only when they finish their respective tamping operations to move said locking bars each independently to a position where the starting mechanism can start the work carrier.

28. In a device of the class described, the combination with a movable work carrier having molds thereon, a pair of tamping machines adjacent to the work carrier adapted to each work upon a mold brought to it by said work carrier, means for moving the work carrier to supply molds in succession to said tamping machines, a starter mechanism normally urged to permit the movement of the work carrier, a movable member rotatable by the starter mechanism, a pair of locking bars interfitting with irregular parts on said movable member, means connecting each locking bar to its adjacent tamping machine, adapted to be actuated by said tamping machines only when they finish their respective tamping operations to move said locking bars each independently to a position where the starting mechanism can start the work carrier, and means operated by the work carrier when it has moved another mold under each tamping machine to restore said bars to position where they lock the work carrier starter.

29. In a device of the class described, in combination with a work carrier mechanism and a pair of tamping machines, a rotatable shaft normally urged in one direction to start the work carrier mechanism, a wheel carried by said shaft, a pair of reciprocatable locking bars interlocking with irregularities on said wheel, and means connecting each of said bars to a tamping machine, the whole so arranged that as long as either tamping machine is in operation the wheel will be locked by at least one bar.

30. In a device of the class described, in combination with a suitable support and a mold into which a workable object is to be driven, a plunger positioned in the support with reference to the mold for reciprocation to perform said operation, a supply chamber for workable objects to be driven by the plunger into said mold, positioned to discharge workable objects one at a time into position between the plunger and the mold, a pair of gripping jaws movable transversely of the path of travel of the plunger, adapted to hold a workable object over the mold in the path of travel of the plunger, a power shaft, means driven by the power shaft for reciprocating the plunger, a cam carried by the power shaft, lever mechanism controlled by the cam adapted to control said gripping jaws to grasp and hold a workable object during the first portion of operation by the plunger thereon and to, thereafter, be released and moved out of the way of the plunger, an escapement mechanism for the supply chamber adapted to deliver one workable object at a time to said jaws, and means operatively connecting the escapement mechanism with the plunger, all for the purposes set forth.

31. In a device of the class described, in combination with a suitable support and a mold into which a workable object is to be driven, a plunger positioned in the support with reference to the mold for reciprocation to perform said operation, a supply chamber for workable objects to be driven by the plunger into said mold, positioned to discharge workable objects one at a time into position between the plunger and the mold, a pair of gripping jaws movable transversely of the path of travel of the plunger, adapted to hold a workable object over the mold in the path of travel of the plunger, a power shaft, means driven by the power shaft for reciprocating the plunger, a cam carried by the power shaft, lever mechanism controlled by the cam adapted to control said gripping jaws to grasp and hold a workable object during the first portion of operation by the plunger thereon and to, thereafter, be released and moved out of the way of the plunger, an escapement mechanism for the supply chamber adapted to deliver one workable object at a time to said jaws, means operatively connecting the escapement mechanism with the plunger, and means for adjusting the escapement mechanism with reference to the operation of the plunger, for the purposes set forth.

In witness whereof, I have hereunto subscribed my name in the presence of two witnesses.

JOHN GRAVES.

Witnesses:
W. S. MARVIN,
H. S. CHENEY.